US007756067B2

(12) United States Patent
Fujii et al.

(10) Patent No.: US 7,756,067 B2
(45) Date of Patent: Jul. 13, 2010

(54) WIRELESS COMMUNICATION EQUIPMENT, WIRELESS COMMUNICATION CONTROL METHOD, AND PROGRAM

(75) Inventors: Kenichi Fujii, Katsushika-ku (JP); Tetsuo Ido, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 756 days.

(21) Appl. No.: 11/292,043

(22) Filed: Nov. 30, 2005

(65) Prior Publication Data

US 2006/0114873 A1     Jun. 1, 2006

(30) Foreign Application Priority Data

Nov. 30, 2004  (JP)  ............................. 2004-347243
Dec. 2, 2004   (JP)  ............................. 2004-350210

(51) Int. Cl.
*H04B 7/00*   (2006.01)
(52) U.S. Cl. ...................... 370/310; 370/401; 455/434; 455/435.2
(58) Field of Classification Search ................. 370/310, 370/401; 455/434, 435.2
See application file for complete search history.

(56) References Cited

U.S. PATENT DOCUMENTS

2003/0076842 A1*  4/2003  Johansson et al. ........... 370/401

FOREIGN PATENT DOCUMENTS

WO           01/41348 A2    6/2001

OTHER PUBLICATIONS

"Technology Kaitaishinsho Bluetooth™ Technical Interpretation Guide", edited by Japan Ericsson, written by Kazuhiro Miyasu, RIC Teleocm, pp. 21, 22, 39-41, 45-47, 181-186.
Son et al., "Predictive scheduling approach in Inter-piconet Communications", Distributed Real-Time Group, Department of Control Engineering, Aalborg University, Denmark, Jun. 2001, pp. 2001-2006.
European Search Report dated Mar. 3, 2006.
Communication from European Patent Office dated Mar. 27, 2006.

* cited by examiner

*Primary Examiner*—Patrick N Edouard
*Assistant Examiner*—Chuck Huynh
(74) *Attorney, Agent, or Firm*—Cowan, Liebowitz & Latman, P.C.

(57) ABSTRACT

According to this invention, a wireless communication equipment which communicates with a plurality of nodes supplies an access control technique for improving communication efficiency. For this purpose, a wireless communication equipment is connected to a plurality of networks, and includes a communication unit which sequentially communicates, at a predetermined interval, with devices included in the plurality of network, a determination unit which determinates a communication control parameter of each of the devices when a connection network count changes, a notification unit which notifies the device in the network of the communication control parameter determined by the determination unit, and a communication control unit which controls the communication unit in accordance with the communication control parameter notified by the notification unit.

6 Claims, 20 Drawing Sheets

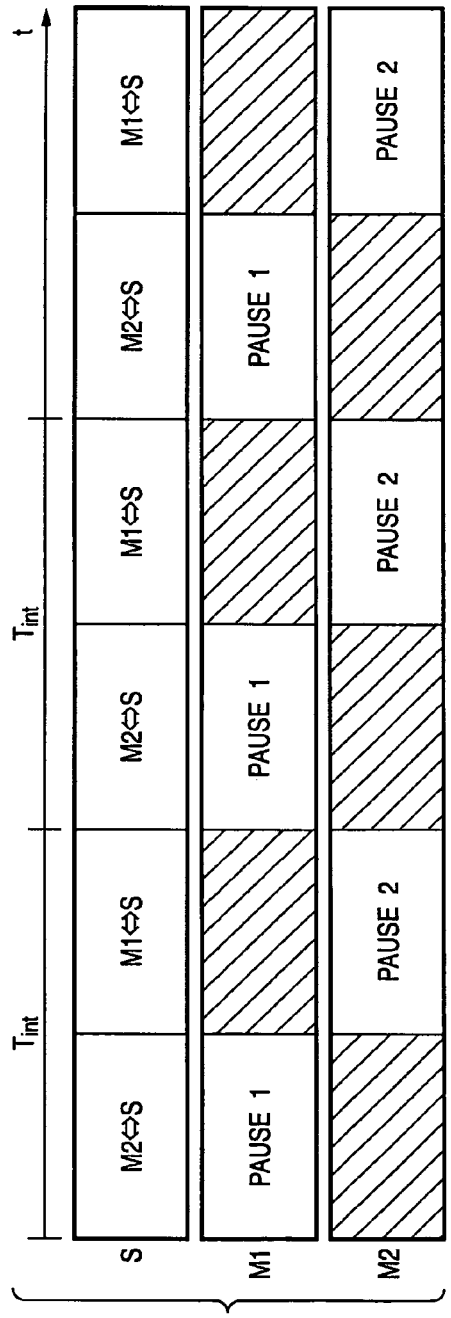
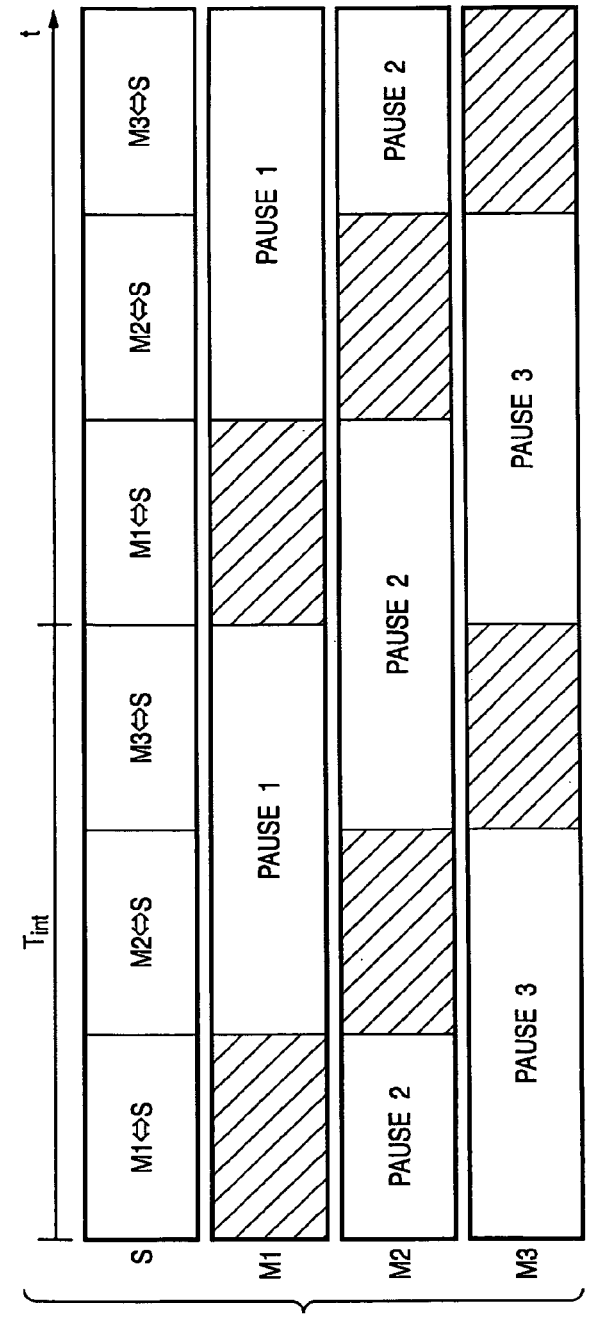
FIG. 3A
FIG. 3B

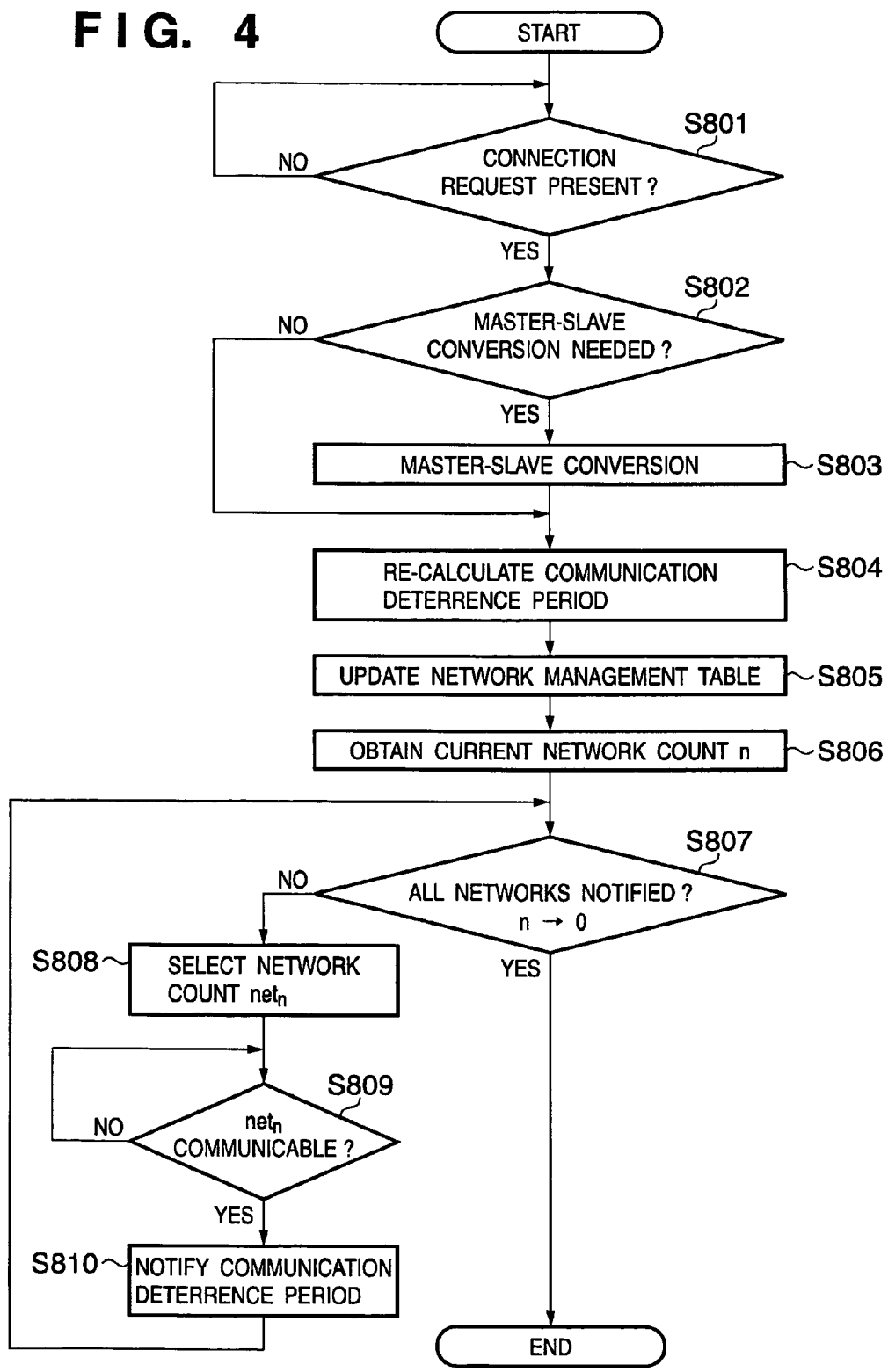

FIG. 5

| NETWORK IDENTIFICATION NAME | COMMUNICATION DETERRENCE PERIOD $T_{msk}$ | COMMUNICATION DETERRENCE INTERVAL $T_{int}$ | DETERRENCE CONTROL START TIMING $T_{str}$ |
|---|---|---|---|
| AA : BB : 12 : 34 : 56 : 78 | 600 | 1200 | 0 |
| 11 : 22 : 33 : 44 : 55 : 66 | 600 | 1200 | 600 |

F I G. 6

| NETWORK IDENTIFICATION NAME | COMMUNICATION DETERRENCE PERIOD $T_{msk}$ | COMMUNICATION DETERRENCE INTERVAL $T_{int}$ | DETERRENCE CONTROL START TIMING $T_{str}$ |
|---|---|---|---|
| AA : BB : 12 : 34 : 56 : 78 | 800 | 1200 | 0 |
| 11 : 22 : 33 : 44 : 55 : 66 | 800 | 1200 | 400 |
| 11 : 22 : 33 : 44 : 55 : 66 | 800 | 1200 | 800 |

FIG. 7

| NETWORK IDENTIFICATION NAME | COMMUNICATION DETERRENCE PERIOD $T_{msk}$ | COMMUNICATION DETERRENCE INTERVAL $T_{int}$ | DETERRENCE CONTROL START TIMING $T_{str}$ |
|---|---|---|---|
| AA : BB : 12 : 34 : 56 : 78 | 1200 | 1800 | 0 |
| 11 : 22 : 33 : 44 : 55 : 66 | 1200 | 1800 | 600 |
| 11 : 22 : 33 : 44 : 55 : 66 | 1200 | 1800 | 1200 |

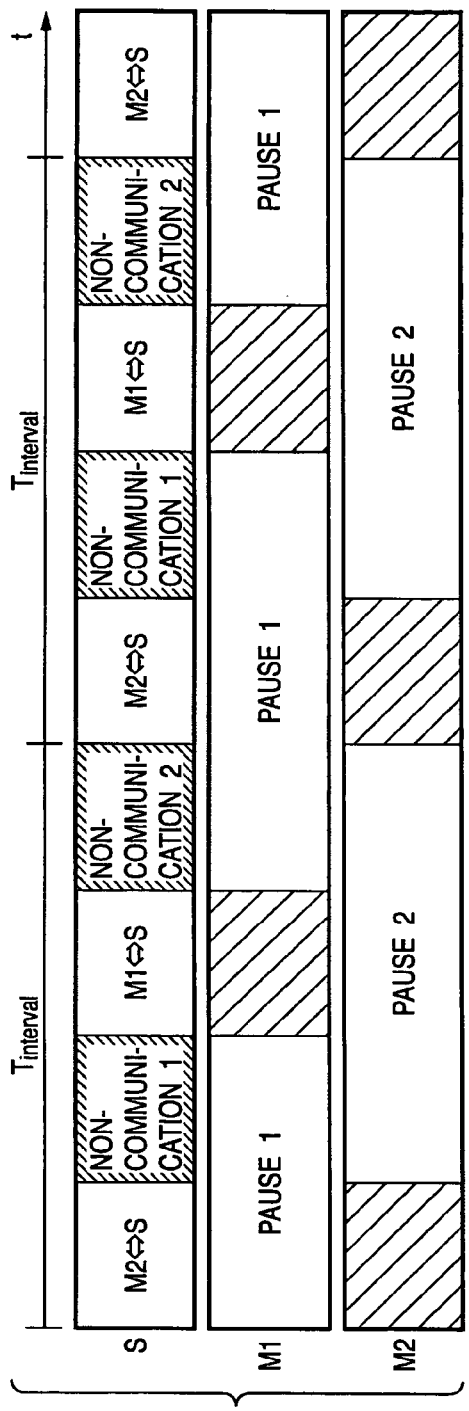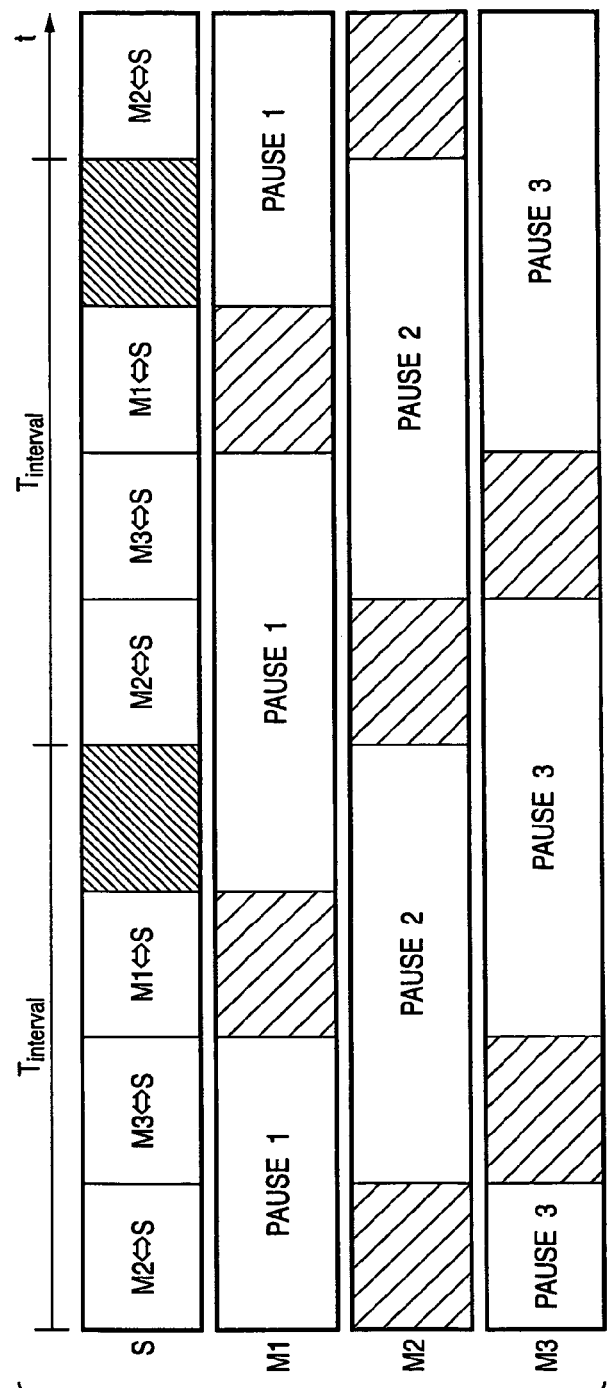

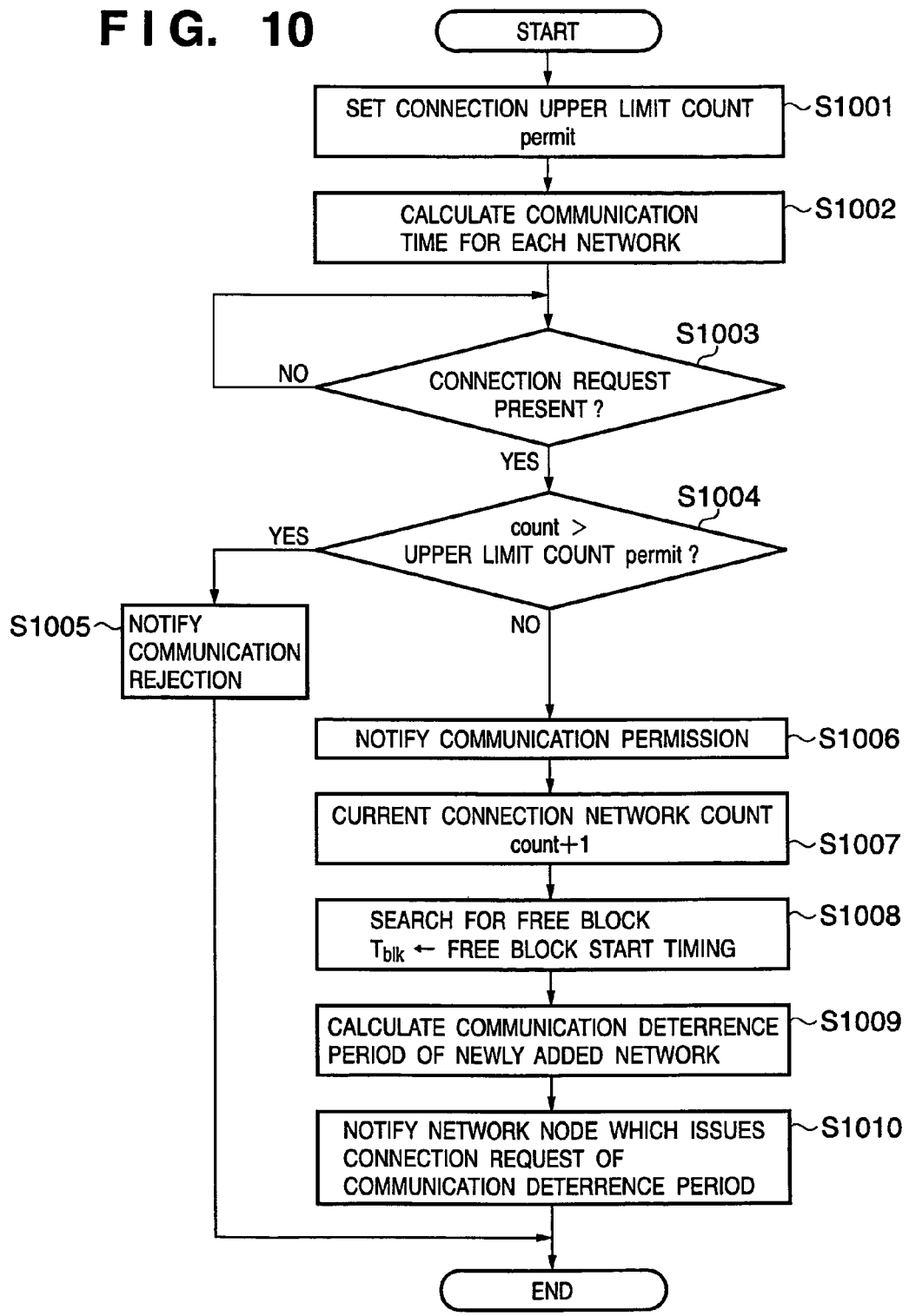

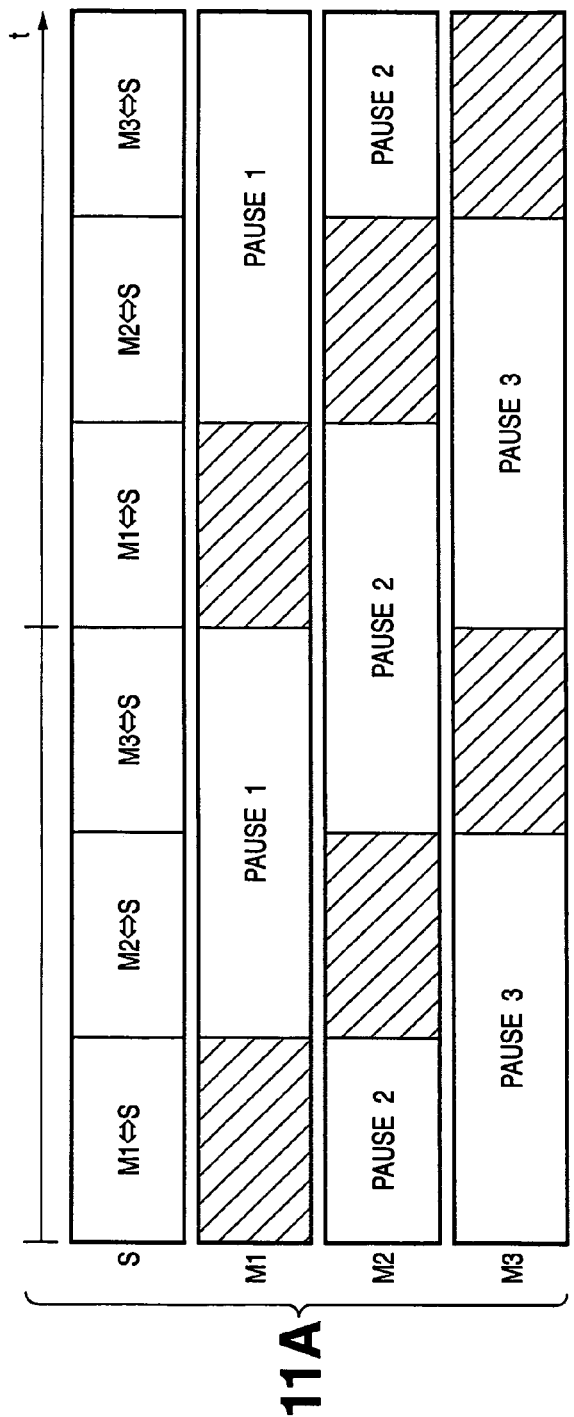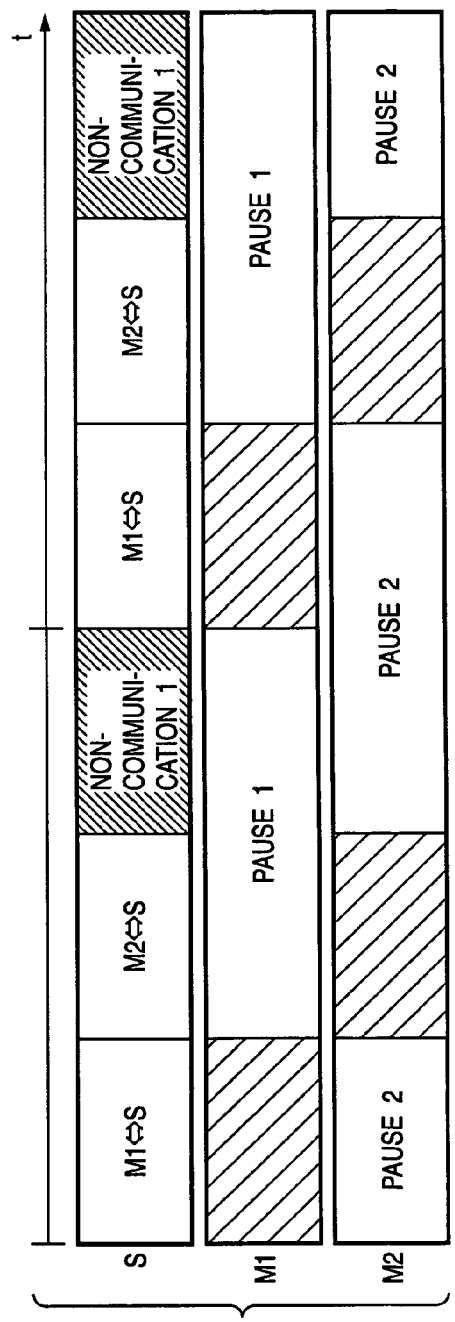

WIRELESS COMMUNICATION EQUIPMENT, WIRELESS COMMUNICATION CONTROL METHOD, AND PROGRAM

FIELD OF THE INVENTION

The present invention relates to an access control technique in wireless communication.

BACKGROUND OF THE INVENTION

In Bluetooth®, a network includes a master node which performs polling control for communication timing control and access control of a communication device, and a slave node which performs communication in accordance with a signal from the master node. One master node and at most seven slave nodes can construct a network as referred to as a piconet. In order to connect the communication device belonging to the Bluetooth® network to an Ethernet® LAN, an access point serves as the master node, and the communication device connected to the network serves as the slave node. In Bluetooth®, a frequency hopping spread spectrum scheme is used. In the piconet, time division multiplex (time division slot multiplex) is performed for each slot. And a plurality of nodes in the piconet can communicate with each other. Since a slot synchronous state must be maintained, all the nodes in the piconet have counters called Bluetooth clocks. In one piconet, in order to match the Bluetooth clock value of the slave with that of the master, a clock offset which is a shift between the Bluetooth clock values of the slave node and master node is calculated. Accordingly, the clock synchronous state can be maintained by adding (subtracting) the offset value to (from) the Bluetooth clock value of the slave node. The nodes in a single piconet have the same frequency-hopping pattern. Hence, the nodes can communicate with each other.

Bluetooth® defines the following arrangement (to be referred to as a scatternet hereinafter). When the communication device currently connected to the access point (a piconet) is to join another piconet (e.g., a new piconet including a communication device such as a PC), the communication device shifts to a power-saving mode in which intermittent reception is temporarily performed in communication with the master node (in this case, the access point) which controls the current piconet. Then, the connection with the access point is released, and communication is performed after switching to the communication timing of the new piconet.

In a Bluetooth® piconet operation, the communication devices (slave nodes) communicate with each other via the master node which controls an access timing. Accordingly, the traffic increases in a wireless section, and data cannot be efficiently transferred. In the scatternet operation described as a unit for avoiding this problem in the prior art, access-timing control for a specific slave node (to be referred to as a slave 1) is performed by determining the access timing in accordance with the power-saving mode timing set between the slave 1 and master node which operate asynchronously. Hence, the initially set access time cannot be ensured in accordance with clock frequency shift between the master nodes.

When the communication traffic between the slave 1 and the master, and the communication time between the slave 1 and another master are to be changed, a power-saving mode shift time between the master and the slave 1 must be reset. Hence, it is difficult to sequentially accommodate the access time in accordance with the change in the traffic. As a means for solving this problem, a method of notifying of a period (communication deterrence period) in which the slave capable of joining the plurality of piconets does not join the piconet has been studied. However, a method of notifying the master of the communication deterrence period has not been disclosed yet, and it is difficult to perform access control in accordance with a communication state such as the traffic.

As described above, in a wireless communication scheme in which one wireless communication node can belong to the plurality of wireless networks at the same time, a timing for accessing/inaccessing to each of the networks must be arbitrated. However, this arbitration is difficult.

SUMMARY OF THE INVENTION

In a wireless communication equipment which communicates with a plurality of nodes, an access control technique of improving communication efficiency has been desired. The present invention has been made in consideration of these problems, and has as its object to provide an access control technique of improving communication efficiency.

In order to solve the problems, the wireless communication equipment according to the present invention has the following arrangement. That is, a wireless communication equipment is connected to a plurality of networks, and comprises a communication unit which sequentially communicates, at a predetermined interval, with devices included in the plurality of network, a determination unit which determinates a communication control parameter of each of the devices when a connection network count changes, a notification unit which notifies the device in the network of the communication control parameter determined by the determination unit, and a communication control unit which controls the communication unit in accordance with the communication control parameter notified by the notification unit.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 3A is a view showing a communication timing of each node corresponding to FIG. 2A according to the first embodiment;

FIG. 3B is a view showing a communication timing of each node corresponding to FIG. 2B according to the first embodiment;

FIG. 4 is an operation flowchart of a network camera 101 when the node is newly connected;

FIG. 5 shows an example of a network management table when the node is connected to two piconets;

FIG. 6 shows an example of a network management table when the node is connected to three piconets;

FIG. 7 shows another example of a network management table when the node is connected to three piconets;

FIG. 9A is a view showing a communication timing of each node before the node is connected to the piconet according to the second embodiment;

FIG. 9B is a view showing a communication timing of each node after the node is connected to the piconet according to the second embodiment;

FIG. 10 is a flowchart showing a communication timing calculation process when the node is connected to the piconet according to the second embodiment;

FIG. 11A is a view showing a communication timing of each node before the node is disconnected from the piconet according to the second embodiment;

FIG. 11B is a view showing a communication timing of each node after the node is disconnected from the piconet according to the second embodiment;

DETAILED DESCRIPTION OF THE PREFERRED EMBODIMENTS

Embodiments of the present invention will now be described in detail with reference to the accompanying drawings. It should be noted that elements in the embodiments to be described hereinafter are examples, and the present invention is not limited to these.

First Embodiment

<Outline>

In the first embodiment, in accordance with an increase/decrease in the number of connected networks (nodes), a new communication timing is allocated to each network (node) by changing a communication deterrence period and the like.

<System Arrangement>

Figure 1:
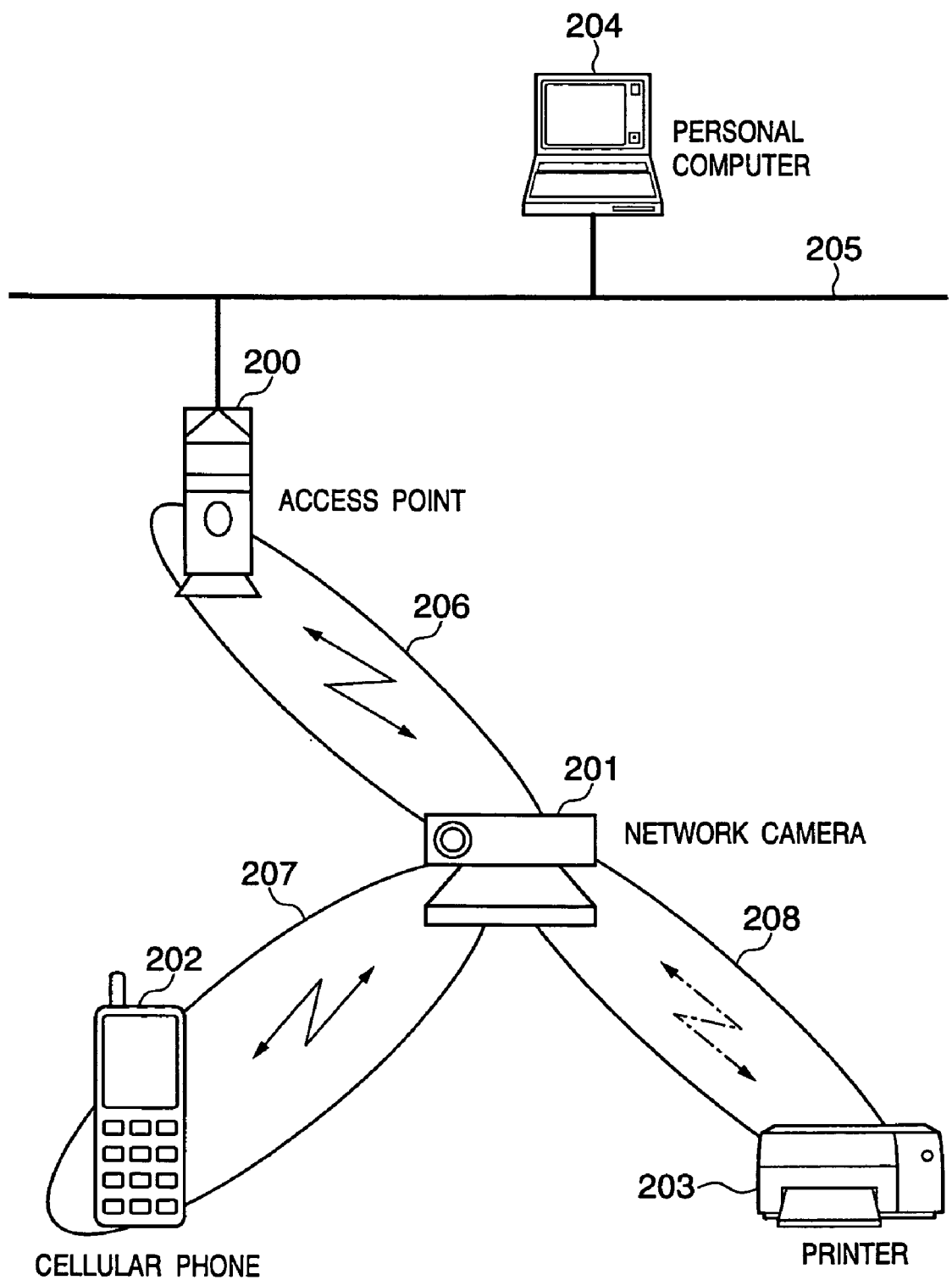
FIG. 1 is a view showing a communication system including a communication equipment according to the first embodiment of the present invention.

FIG. 1 is a view showing a communication system including a communication equipment according to the first embodiment of the present invention. Note that this communication equipment comprises a network camera.

Reference numeral 201 denotes a network camera having a wireless communication function and an image sensing function. A wireless access point 200, the network camera 201, a cellular phone 202, and a printer 203 can exchange a command and data containing sensed image in Bluetooth wireless communication. A personal computer (PC) 204 can transmit/receive data to/from the network camera 201 via an Ethernet® LAN 205 and the access point 200.

The network camera 201 can also communicate with a plurality of networks. The arrangement of these networks is called a scatternet in which the number of networks can be dynamically increased and decreased. In this scatternet, the network camera 201 and the wireless access point 200 construct a piconet 206, the network camera 201 and the cellular phone 202 construct a piconet 207, and the network camera 201 and the printer 203 construct a piconet 208. The network camera 201 is connected to the three piconets, and can communicate with each of the piconets.

The network camera 201 has a control equipment, and the control equipment includes, e.g., a central processing unit (CPU), a ROM (Read Only Memory) which stores a program executed by the CPU, a RAM (Random Access Memory) used for calculation of the CPU, and an input/output equipment.

Figure 2A:
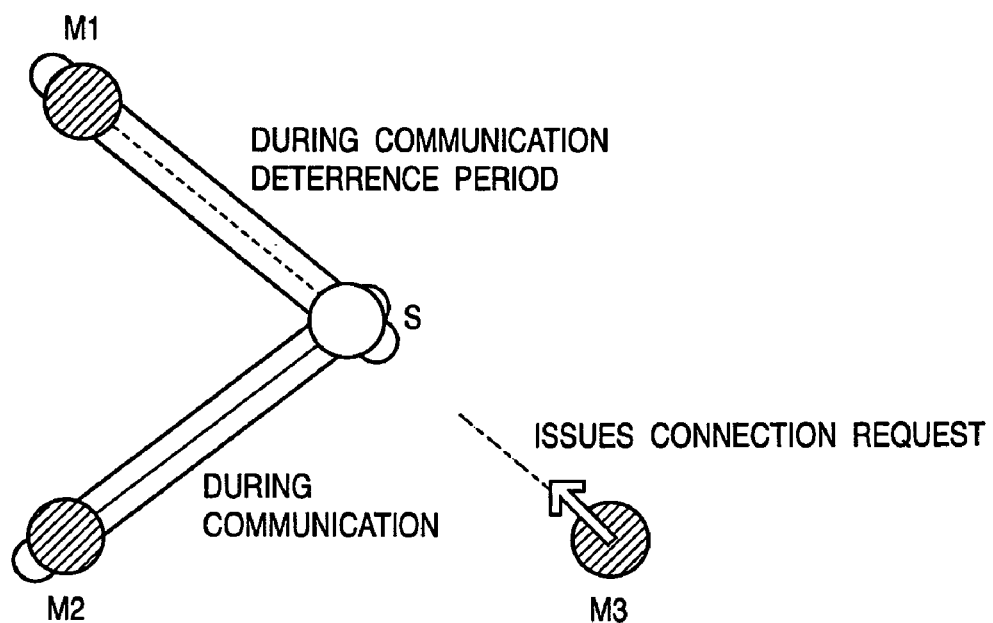
FIG. 2A is a view exemplifying a state before a node is newly connected to the communication equipment.
Figure 2B:
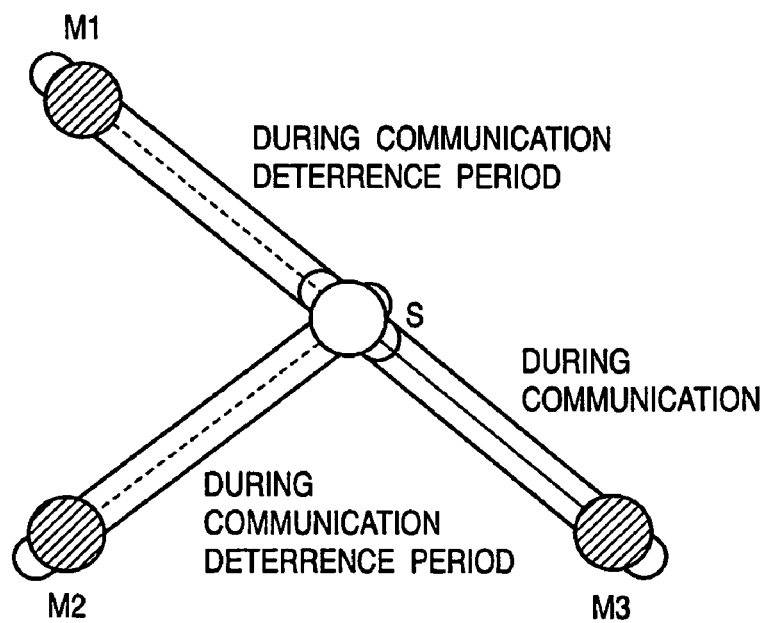
FIG. 2B is a view exemplifying a state after the node is newly connected to the communication equipment.

FIGS. 2A and 2B are views exemplifying a state in which one node is newly connected to the communication equipment to start communication.

A node S serving as a slave node is equivalent to the network camera 201 shown in FIG. 1, and performs a Bluetooth slave operation. A node M1 serving as a master node is equivalent to the wireless access point 200, and performs a Bluetooth master operation. The node S and the node M1 construct the piconet 206. A node M2 is equivalent to the cellular phone 202, and performs a Bluetooth master operation. The node S and the node M2 construct the piconet 207. Additionally, a node M3 is equivalent to the printer 203. In FIG. 2A, the node M3 tries to connect to the node S.

As shown in FIG. 2A, in order to perform communication arbitration with the plurality of piconets, the node S and the node M1 are in the communication deterrence period, the node S and the node M2 are communicating with each other, and the node M3 issues a communication request to the node S.

FIG. 2B shows a state in which the node M3 and the node S are connected and are communicating with each other in response to the connection request from the node M3 to the node S as shown in FIG. 2A.

In this state, the node S and the node M1 are in the communication deterrence period, the node S and the node M2 are also in the communication deterrence period, and the node S and the node M3 are communicating with each other.

As described above, while the node S is communicating with a given node in a given piconet, communication between the node S and the remaining nodes in the remaining piconets is deterred.

<Communication Timing>

FIGS. 3A and 3B are views showing the communication timing of each node corresponding to FIGS. 2A and 2B according to the first embodiment.

In FIGS. 3A and 3B, "M2⇔S" in the slot block of the node S indicates that the node M2 and the node S communicate with each other in the piconet, and "M1⇔S" indicates that the node M1 and the node S communicate with each other in the piconet. "PAUSE1" in the slot block of the node M1 indicates that the node S and the node M1 are in the communication deterrence period. In this period, the node S and the node M2 communicate with each other. "PAUSE2" in the slot block of the node M2 indicates that the node S and the node M2 are in the communication deterrence period. In this period, the node S and the node M1 communicate with each other.

After the node M3 issues the connection request to the node S in the state shown in FIG. 3A, the states of the node S and nodes M1, M2, and M3 change along time as shown in FIG. 3B. In FIG. 3B, "M3⇔S" in the slot block of the node S indicates that the node M3 and the node S are in communication with each other in the piconet. "PAUSE3" in the slot block of the node M3 indicates that the node S and the node M3 are in the communication deterrence period. In this period, the node S communicates with the node M1 or M2. Note that in FIG. 3B, the communication time is not changed, and the communication deterrence period and a communication deterrence interval Tint are changed. The detailed state will be described later.

The node S allocates the total communication time to the nodes M1, M2, and M3 so as to avoid collision between the communication deterrence period and the communication period.

As described above, when the image processing capability (e.g., an image processing capability of 21 frames/sec) of the network camera 201 (node S) is to be shared with the nodes 200, 202, and 203 (nodes M1, M2, and M3), each of the three nodes transfers an image at seven frames/sec. Accordingly, the total communication time can be equally divided, and allocated to the nodes.

<Operation Flow>

FIG. 4 is an operation flowchart of the network camera 201 when a node is newly connected.

The network camera 201 waits for reception of a new connection request (S801). Upon reception of the new connection request, the flow advances to step S802.

In step S802, it is checked whether master-slave conversion (i.e., role change) generally required when the network camera 201 is to construct a plurality of different networks is also required in this step. If YES in S802, the flow advances to step S803. If NO in step S802, the flow advances to step S804.

In step S803, the network camera 201 performs master-slave conversion.

In step S804, in order to construct a new network, the network camera 201 re-calculates the communication deterrence period and the like. This re-calculation will be described later with reference to FIG. 8.

A network management table which manages pieces of information pertaining to the plurality of different networks is updated (S805), and a present network count n is obtained (S806). The network management table will be described in detail later.

The piconets are notified of a new communication deterrence period and communication deterrence interval obtained by re-calculation. For this purpose, it is checked whether the notification to all the networks has been executed (S807). If YES in step S807 (i.e., if the control count n becomes zero), this connection process ends. If NO in step S807, the flow advances to step S808.

The piconet (netn) which has not been notified is selected in step S808 to wait until the netn becomes communicable in step S809 (S809). When the netn becomes communicable, the flow advances to step S810, and the netn is notified of the communication deterrence period, communication deterrence interval, and the like. The control count n is then decremented, and the flow returns to step S807.

<Network Management Table>

FIG. 5 shows an example of the network management table when the node is connected to two piconets.

An item in the network management table includes a network identification name, communication deterrence period Tmsk, communication deterrence interval Tint, and deterrence control start timing Tstr for each slot.

FIG. 6 shows an example of the network management table when the node is connected to the three piconets. FIG. 6 shows an example of the network management table in a state wherein the third piconet is added, and the network management table is updated in step S805 after re-calculation of the communication deterrence period and the like in step S804 in FIG. 4. The communication deterrence interval Tint is kept unchanged, and then re-calculated.

FIG. 7 shows another example of the network management table when the node is connected to the three piconets. FIG. 7 shows an example of the network management table in a state wherein the third piconet is added, and the network management table is updated in step S805 after re-calculation of the communication deterrence period and the like in step S804 in FIG. 4. The communication deterrence interval Tint is changed, and then re-calculated.

Figure 8:
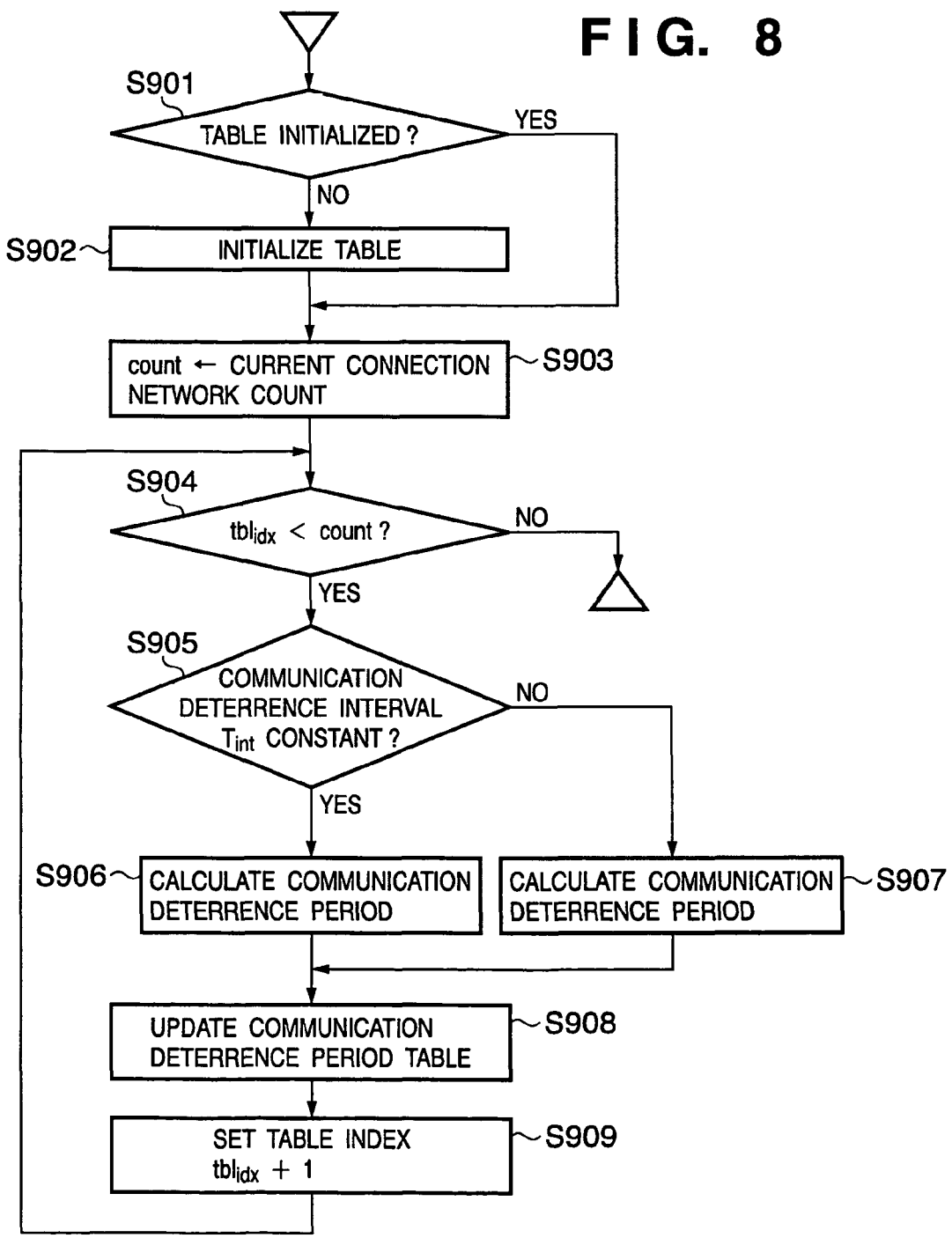
FIG. 8 is a flowchart showing a communication timing calculation process according to the first embodiment.

FIG. 8 is a flowchart showing a communication timing calculation process according to the first embodiment.

The network camera 201 confirms whether the contents in the network management table are initialized (S901). If NO in step S901, the contents are initialized (S902). The currently connected piconet count is set as the control count (S903).

A table index tblidx indicating the arrangement position in the network management table is set to "1", and steps S905 to S909 are then repeated until the table index tblidx reaches the control count, i.e., until the network management table of all the piconets has been updated (S904).

It is checked whether the communication deterrence interval Tint shown in FIG. 5 is kept unchanged at a constant value to perform re-calculation (S905). In step S906, the communication deterrence period Tmsk and the deterrence control start timing Tstr are calculated according to the following equations:

$$Tmsk = (Tint \div count) \times (count - 1) \quad (1)$$

$$Tstr = tblidx \times (Tint - Tmsk) \quad (2)$$

Sequentially, the item values in the network management table are updated using the values calculated in step S906 (S908). More specifically, in the row of the table index tblidx in the network management table, the value obtained by the equation (1) is set as the communication deterrence period Tmsk, and the value obtained by the equation (2) is set as the deterrence control start timing Tstr. The communication deterrence interval Tint which is the constant value in the above calculation is set as the communication deterrence interval Tint. The table index tblidx is then incremented (S909), and the flow returns to step S904.

In step S907, when the communication deterrence interval Tint is not constant, i.e., when a communication time Tcomm is guaranteed to be constant (exemplified in FIG. 2), the communication deterrence period Tmsk, communication deterrence interval Tint, and deterrence control start timing Tstr are calculated according to the following equations (3), (4), and (5):

$$Tmsk = Tcomm \times (count - 1) \quad (3)$$

$$Tint = Tcomm \times count \quad (4)$$

$$Tstr = tblidx \times (Tint - Tmsk) \quad (5)$$

Sequentially, the item values in the network management table are updated using the values calculated in step S907 (S908). More specifically, in the row of the table index tblidx in the network management table, the value obtained by the equation (3) is set as the communication deterrence period Tmsk, the value obtained by the equation (4) is set as the communication deterrence interval Tint, and the value obtained by the equation (5) is set as the deterrence control start timing Tstr.

As described above, in the first embodiment, the communication deterrence period is determined such that the communication time can be given at a high communication efficiency, even when a new network is added. Accordingly, in the equipment such as the network camera 201 having fixed image processing capability, image browsing can be shared by the nodes.

The equipment notified of the communication deterrence period and the communication deterrence interval can shift to the power-saving mode during the communication deterrence period, and power consumption can be reduced. Since the equipment can shift to the power-saving mode at the notified interval, the equipment can efficiently shift to the power-saving mode. The communication deterrence period can be arbitrated such that the communication time can be divided at the high communication efficiency even when the new network is added.

For example, the communication deterrence period can be given to the communication equipment required to transfer the data in real time, such that the transfer interval can be ensured.

Note that when the transfer data amount varies for each network-compatible equipment, a longer access time is allocated to an equipment which requires a larger amount of data. Hence, data can be transmitted to such an equipment with a higher priority.

Second Embodiment

<Outline>

In an image transfer system according to the second embodiment, the number of connectable networks (piconets) is limited in advance. Even when the network count increases/decreases, a communication deterrence period and the like are not changed, and each node can transfer an image at each predetermined constant interval.

Note that the arrangement of the second embodiment is basically the same as that of the first embodiment. The same reference numerals as in the first embodiment denote the same parts in the second embodiment, so the description in the first embodiment is also used in the second embodiment, and only different portions will be described below.

<Communication Timing (In Connection)>

FIGS. 9A and 9B are views showing the communication timing of each corresponding node before and after connection to the piconet according to the second embodiment.

In this case, the number of networks to which a node S can be connected is limited to four in advance, and a communication interval between the node S and each of the four networks is set as constant Tinterval (Tint).

In FIG. 9A, "M2⇔S" in the slot block of the node S indicates that a node M2 and the node S communicate with each other in the piconet, and "M1⇔S" indicates that a node M1 and the node S communicate with each other in the piconet. Also, "non-communication 1" and "non-communication 2" indicate that the node S does not communicate with any piconet. That is, FIG. 9A shows that the node S has not communicated with two of four piconets with which the node S can communicate.

"PAUSE1" in the slot block of the node M1 shown in FIG. 9A indicates that the node S and the node M1 are in the communication deterrence period. "PAUSE2" in the slot block of the node M2 shown in FIG. 9A indicates that the node S and the node M2 are in the communication deterrence period.

After the node M3 issues the connection request to the node S in the state shown in FIG. 9A, the states of the node S and nodes M1, M2, and M3 change along time as shown in FIG. 9B. In FIG. 9B, "M3⇔S" in the slot block of the node S indicates that the node M3 and the node S are in communication with each other in the piconet. "PAUSE3" in the slot block of the node M3 shown in FIG. 9B indicates that the node S and the node M3 are in the communication deterrence period.

The node S allocates the slot block of "non-communication 1" to the node M3. However, the communication deterrence period and communication interval Tinterval (Tint) in each of the nodes M1 and M2 are kept unchanged along with this allocation.

<Operation Flow (In Connection)>

FIG. 10 is a flowchart showing a communication timing calculation process in piconet connection according to the second embodiment.

A network camera 201 sets the upper limit numbers of nodes (access points, cellular phones, and printers) permitted to be connected to the network camera 201 in a variable permit (S1001). The communication time Tcomm for each network is calculated according to the following equation (6) (S1002):

$$Tcomm = \text{communication deterrence interval } Tint \div permit \quad (6)$$

Note that the communication time Tcomm for each network is obtained by equally dividing the communication interval Tint. However, the communication interval Tint need not always be equally divided.

Sequentially, a connection request is waited for (S1003). When a new connection request is issued, the flow advances to step S1004.

In step S1004, it is determined whether the current connection network count exceeds the variable permit (permitted connection upper limit count). If YES in step S1004, the flow advances to step S1005. If NO in step S1004, the flow advances to step S1006.

In step S1005, communication rejection notification is transmitted to the equipment which has issued the connection request. This calculation process then ends.

In step S1006, communication permit notification is transmitted to the network equipment which issues the connection request. The current connection network count is incremented (S1007), a free block is searched, and the start time of the obtained free block is set as Tblk (S1008). Next, the communication deterrence period Tmsk and the deterrence control start timing Tstr in the newly added network are calculated according to the following equations (7) and (8):

$$Tmsk = Tint - Tcomm \quad (7)$$

$$Tstr = Tblk + Tcomm \quad (8)$$

Only the network equipment which issues the connection request is notified of these obtained values (S1010), and this calculation process ends.

<Communication Timing (in Disconnection)>

FIGS. 11A and 11B are views showing a node communication timing before and after the node is disconnected from the piconet according to the second embodiment.

FIGS. 11A and 11B are views showing the communication state and communication deterrence state of each node along time, when the node S and the nodes M1, M2, and M3 construct three piconets, and the node M3 is disconnected from the node S in response to a disconnection request. Note that the number of networks with which the node S can communicate is set to three.

When the node M3 is disconnected from the node S, the slot block portion used in the node M3 is in a non-communication state ("non-communication 1" shown in the slot block of node S shown in FIG. 11B).

<Operation Flow (in Disconnection)>

Figure 12:
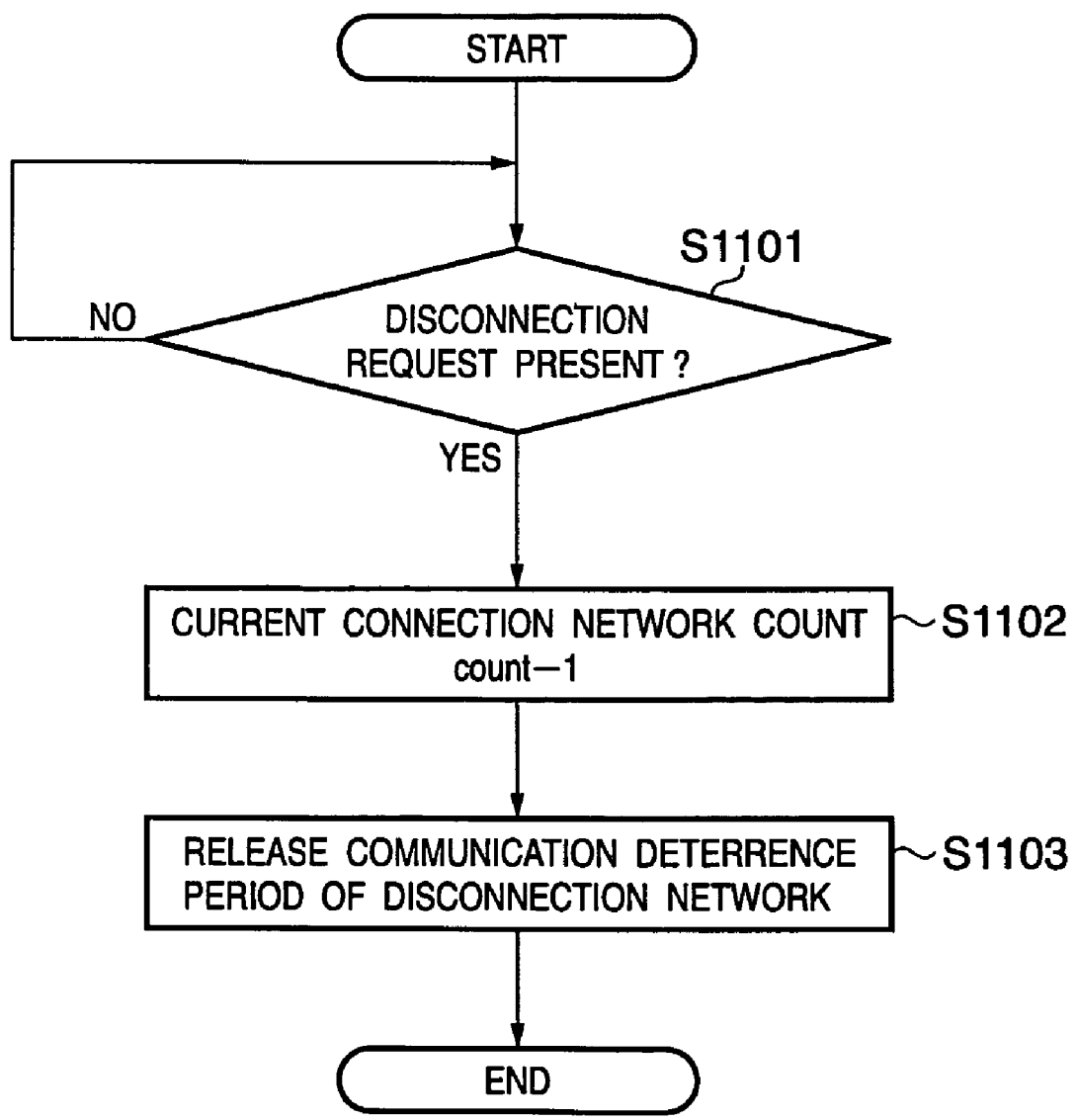
FIG. 12 is a flowchart showing a communication timing change process when the node is disconnected from the piconet according to the second embodiment.

FIG. 12 is a flowchart showing a communication timing change process when the node is disconnected from the piconet according to the second embodiment.

Upon reception of a disconnection request (YES in step S1101), the current connection network count is decremented (S1102). The network equipment is disconnected in response to the disconnection request, and the communication deterrence period of this equipment is released (S1103). Accordingly, this slot block is in the non-communication state.

As described above, in the second embodiment, the connectable network count is limited in advance, and sharing (allocation) of a network resource (communication time) is achieved. Therefore, the device can operate in a low power consumption mode in the non-communication state, and power consumption of the device can be reduced. Furthermore, even when a new network is added, or the connection network count is reduced, the communication deterrence period need not be arbitrated again in the present network. Since only the new network needs to be notified of the communication deterrence period, the network can be easily managed.

The equipment notified of the communication deterrence period and the communication deterrence interval can shift to the power-saving mode during the communication deterrence period, and power consumption can be reduced. Since the equipment can shift to the power-saving mode at the notified interval, the equipment can efficiently shift to the power-saving mode. The communication deterrence period can be arbitrated such that the communication time can be divided at the high communication efficiency even when the new network is added.

For example, the communication deterrence period can be given to the network-compatible equipment required to transfer the data in real time, such that the transfer interval can be ensured.

Note that when the transfer data amount varies for each network-compatible equipment, a longer access time is allocated to an equipment which requires a larger amount of data. Hence, data can be transmitted to such an equipment with a higher priority.

Third Embodiment

<Outline>

In the third embodiment, a communication node stores a plurality of communication parameters including communication deterrence information in advance to select a communication parameter to be used upon an increase/decrease in the connected piconet count. As a result, power consumption can be reduced.

<System Arrangement>

Figure 13:
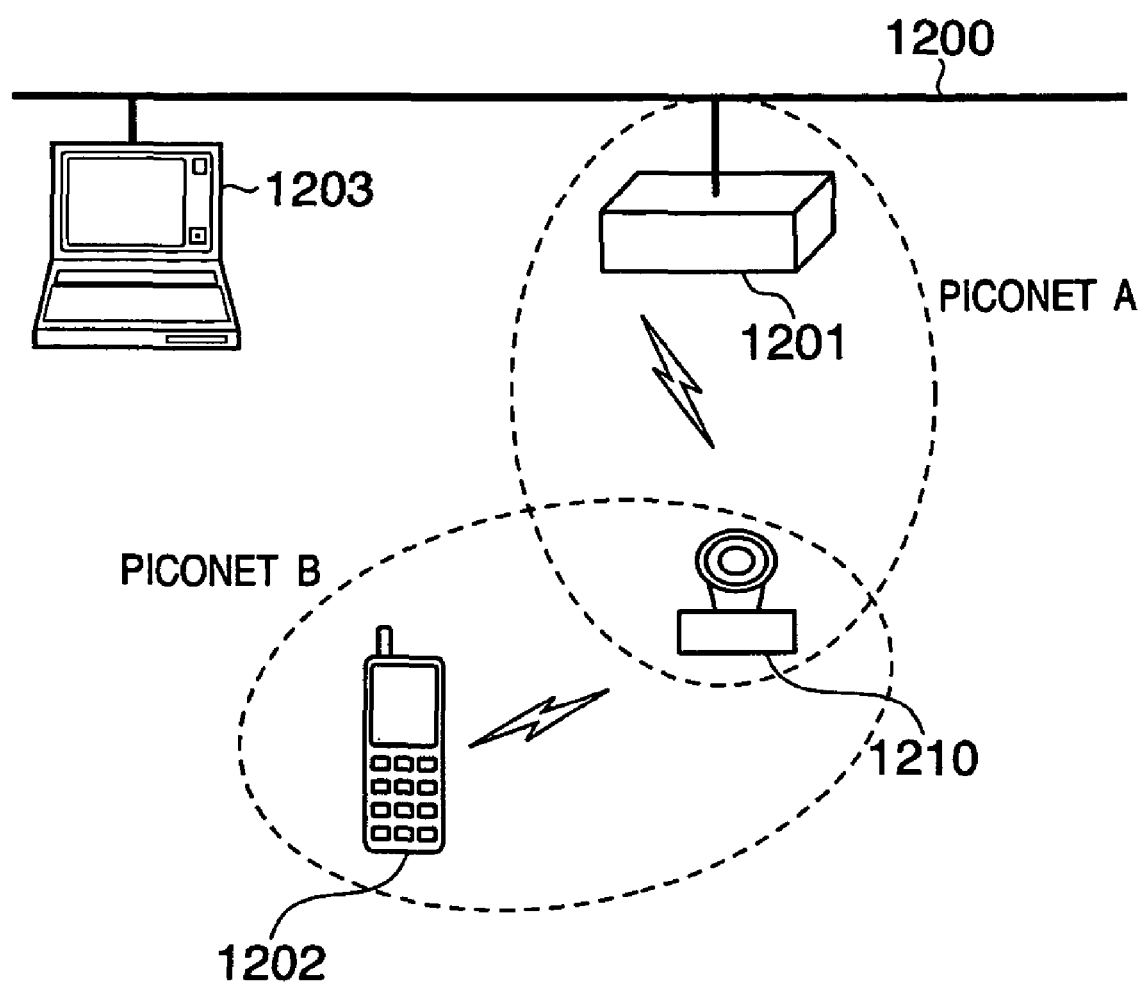
FIG. 13 is a view showing a communication system including a communication equipment according to the third embodiment of the present invention.

FIG. 13 is a view showing a communication system including a communication equipment according to the third embodiment of the present invention.

This system includes a Bluetooth® (to be referred to as BT hereinafter) access point 1201 (to be referred to as an AP hereinafter) connected to a LAN 1200, a network camera 1210 (to be abbreviated as a camera hereinafter) having a BT communication function, and a cellular information node 1202 (to be abbreviated as a cellular node) having the BT communication function and a video display function. The AP 1201 and the camera 1210 construct a piconet A by BT communication. In the piconet A, the AP 1201 serves as a master node, and the camera 1210 serves as the slave node. In addition to the piconet A, the camera 1210 and the cellular node 1202 construct a piconet B by BT communication. In the piconet B, the cellular node 1202 serves as the master node, and the camera 1210 serves as the slave node.

In this arrangement, a PC 1203 connected to the LAN 1200 via the AP 1201 monitors a video sensed by the camera 1210, using application software. At the same time, the cellular node 1202 also monitors, by a viewer, the video sensed by the camera 1210. Note that when the PC 1203 or the cellular node 1202 obtains the control right of the camera 1210, the pan, tilt, and zooming operations of the camera can be performed.

When the camera 1210 communicates with the AP 1201 in the piconet A, the camera 1210 notifies the cellular node 1202 in the piconet B of communication deterrence information. Alternatively, when the camera 1210 communicates with the cellular node 1202 in the piconet B, the camera 1210 notifies the AP 1201 in the piconet A of communication deterrence information. As a result, the camera 1210 joins two piconets time-divisionally.

<Internal Arrangement of Communication Equipment>

Figure 14:
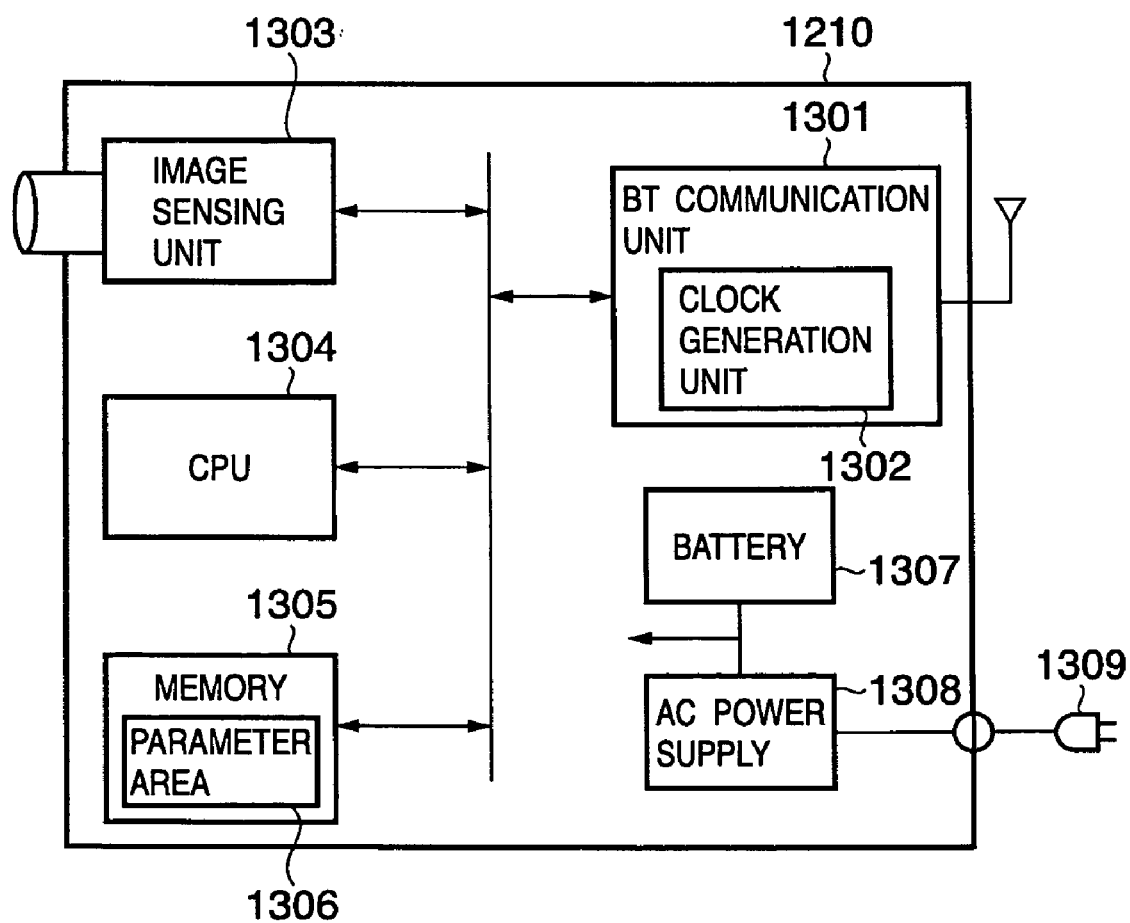
FIG. 14 is a block diagram showing the internal arrangement of a camera serving as the communication equipment according to the third embodiment.

FIG. 14 is a block diagram showing the internal arrangement of the camera serving as the communication equipment according to the third embodiment.

Reference numeral 1301 denotes a BT communication unit which supplies the BT communication function; 1302, a clock generation unit which generates a BT clock serving as the reference of the communication timing of the BT communication unit 1301; 1303, an image sensing unit which senses a video image and converts the sensed video image into digital data; 1304, a CPU which controls the overall operation of the camera 1210; 1305, a memory; 1306, a parameter area which stores the communication parameter in the memory 1305; 1307, a battery; 1308, an AC power supply; and 1309, an AC input unit.

The camera 1210 operates by the AC power supply 1308 when the AC input unit 1309 is connected to a commercial power supply, and operates by the battery 1307 when the AC input unit 1309 is not connected to the commercial power supply. The memory 1305 has an area in which the operation program of the camera 1210 is stored, a work memory area required for the program operation, and a parameter area 1306 in which the communication timing parameter is stored. The video data sensed by the image sensing unit 1303 is converted into an image format in accordance with the image processing capability of a communication partner. After that, the converted video data is wirelessly transmitted to the communication partner via the BT communication unit 1301.

The CPU 1304 can obtain at least a parameter set 1 (for normal mode) and parameter set 2 (for power-saving mode) from the parameter area 1306, and determines which of the parameter sets 1 and 2 is used under the predetermined switching condition. After that, each of the piconets A and B is notified, using the BT communication unit 1301, of the pieces of communication deterrence information for the piconets A and B from the determined parameter set.

The camera 1210 stores the parameter set 1 (for normal mode) and the parameter set 2 (for power-saving mode) in the parameter area 1306. However, these parameter sets may be generated upon activation of the camera 1210 or application, and then stored in the parameter area 1306. Alternatively, the parameter sets may be prepared in advance and used.

<Communication Parameter>

Next, contents notified as the communication deterrence information to the piconets A and B will be described next. The communication deterrence information content includes the communication deterrence period Tmsk, communication deterrence interval Tint, and deterrence control start timing Tstr. Communication deterrence information A (Tstr1, Tint1, and Tmsk1) is notified to the piconet A, and communication deterrence information B (Tstr2, Tint2, and Tmsk2) is notified to the piconet B.

Figure 15:
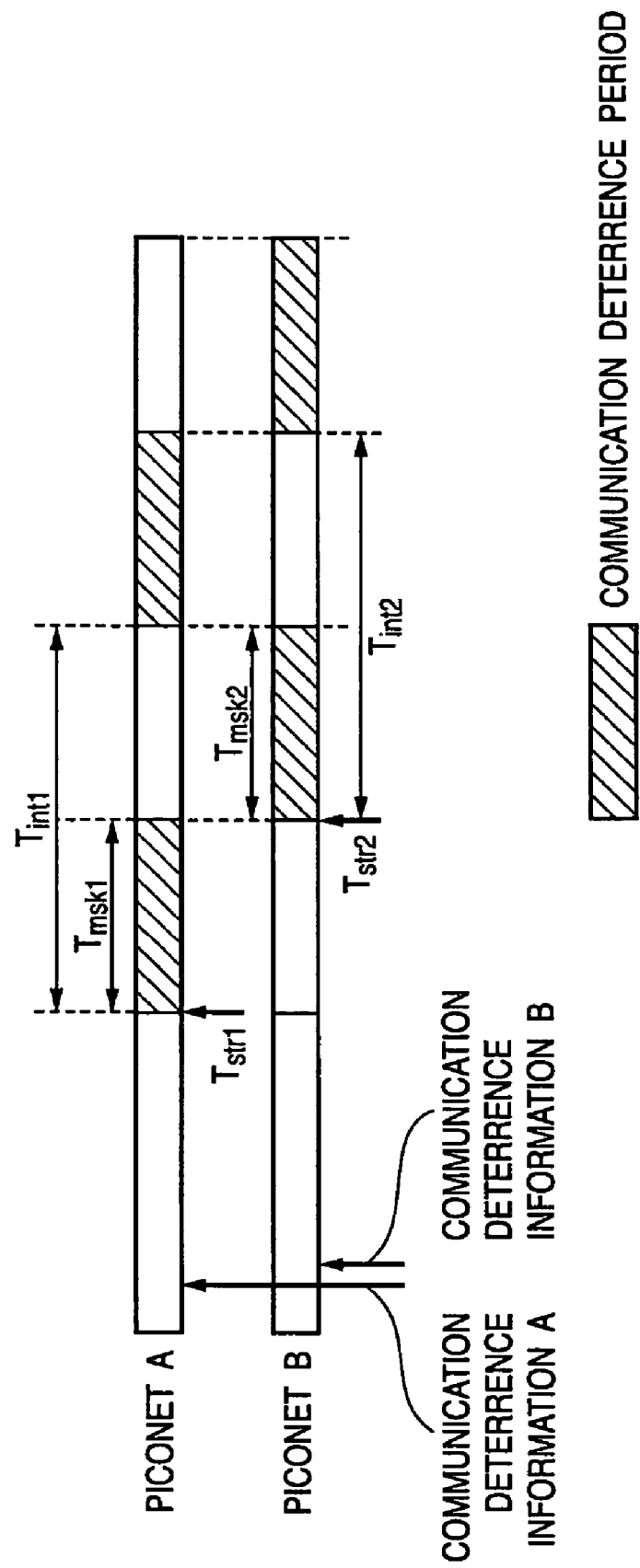
FIG. 15 is a view showing a communication timing of each piconet in a normal mode.

FIG. 15 is a view showing the communication timing of each piconet in the normal mode.

In order to implement communication control shown in FIG. 15, the camera 1210 sets the parameter as follows, and stores the set parameter as the normal mode parameter set 1 in the parameter area 1306.

Tstr1=(arbitrary)
Tint1=(arbitrary)
Tmsk1=Tint1÷2
Tstr2=Tstr1+Tmsk1
Tint2=Tint1
Tmsk2=Tmsk1

Figure 16:
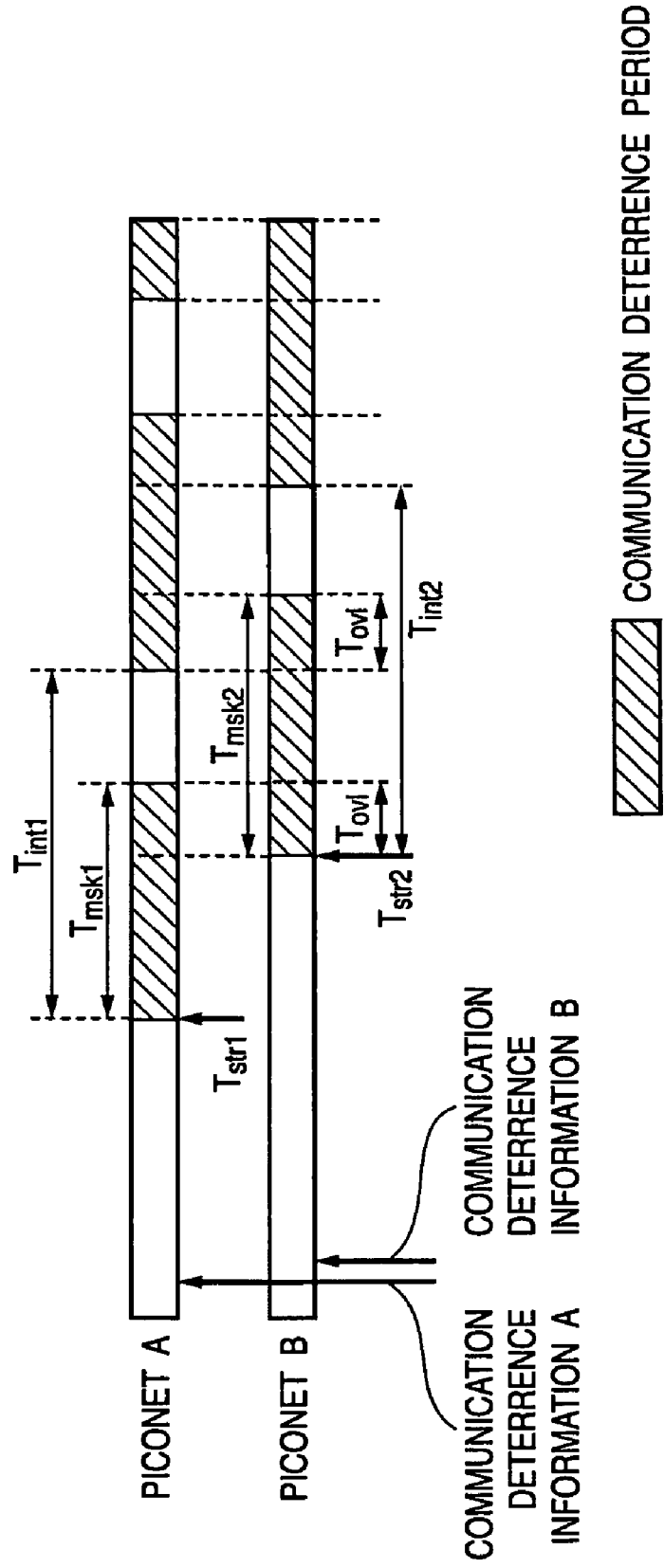
FIG. 16 is a view showing a communication timing of each piconet in a power-saving mode.

FIG. 16 is a view showing the communication timing of each piconet in the power-saving mode.

In order to implement communication control shown in FIG. 16, the camera 1210 sets the parameters as follows, and stores the set parameters as the power-saving mode parameter set 2 in the parameter area 1306.

Tstr1=(arbitrary)
Tint1=(arbitrary)
Tmsk1=Tint1÷2
Tstr2=Tstr1+Tmsk1−Tov1
Tint2=Tint1
Tmsk2=Tmsk1
Tov1=(arbitrary) (less than Tint1÷2)

where Tov1 is a period in which the communication deterrence periods in the piconets A and B are overlapped. In this period, in the camera 1210 serving as the communication node, the BT communication unit 1301 or its portion can be inactive. When Tov1 is made large, power-saving efficiency is also improved. However, the communication bandwidth decreases along with this improvement. Therefore, Tov1 is determined in consideration of the minimum communication bandwidth.

As described above, the normal mode and the power-saving mode are implemented by setting the parameter sets 1 and 2.

<Operation Flow>

Figure 17:
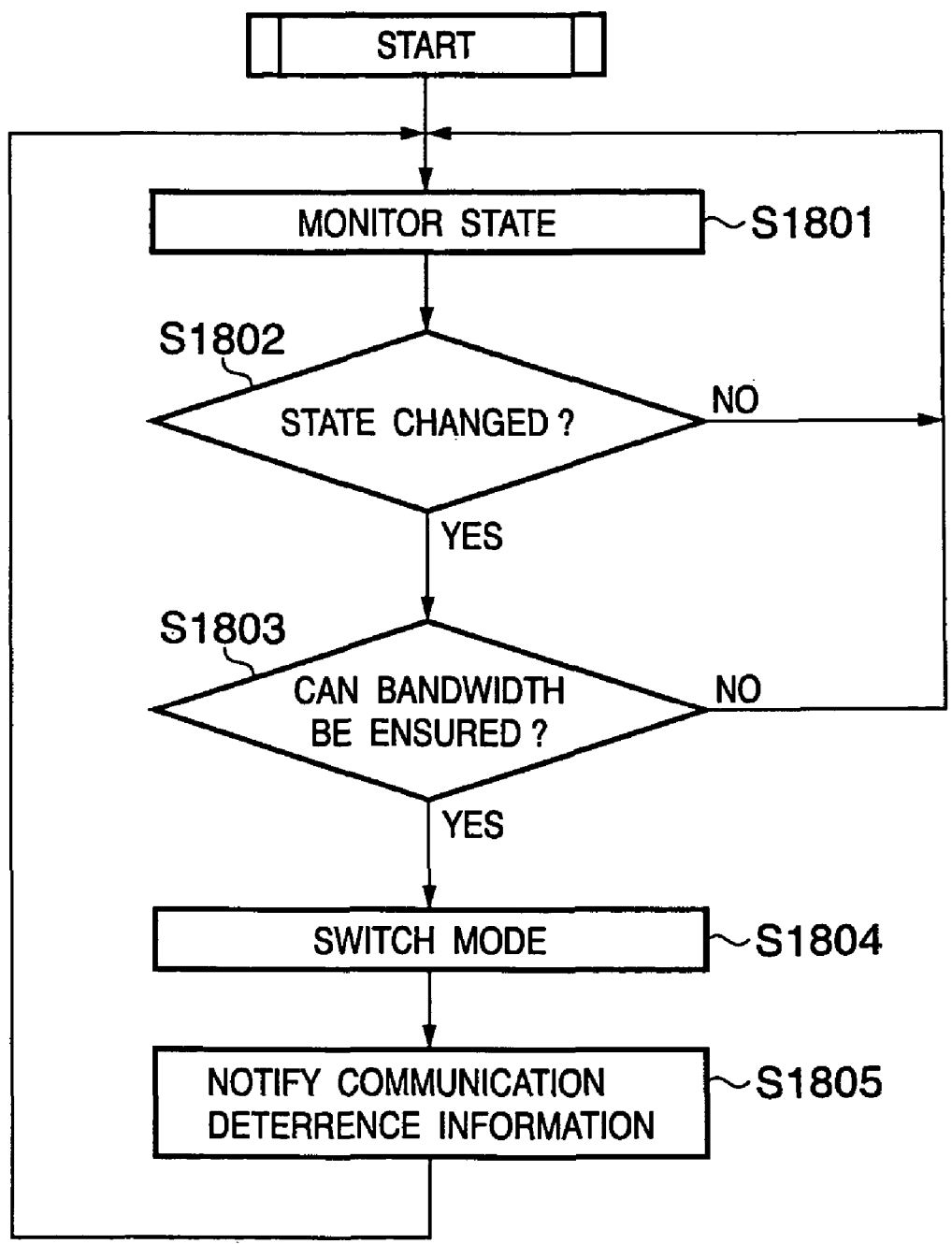
FIG. 17 is an operation flowchart of a camera 210 serving as the communication equipment according to the third embodiment.

FIG. 17 is an operation flowchart of the camera 1210 serving as the communication equipment according to the third embodiment. Note that the above-described parameter sets 1 and 2 are stored in the parameter area 1306 in advance.

Upon activation of the camera 1210, the flow advances to step S1801 to obtain composite state information indicating, e.g., the traffic value and error rate value between the AP 1201 and the camera 1210, the traffic value and error rate value between the cellular node 1202 and the camera 1210, which one of high-quality image viewer and low-quality image viewer is used as the an application program, whether the application program is in a sleep state, monitoring state, or operation state, whether the power is supplied to the camera from the AC consent or battery, and the battery remaining value. However, this state information may be partly obtained.

In step S1802, it is determined whether the state information obtained in step S1801 changes to a predetermined condition. More specifically, an increase/decrease in the traffic amount, an increase/decrease in the error rate, a change in the application program (high-quality image or low-quality image), a change in the application program state (sleep, monitoring, or operation), a change in the power supply method (AC or battery), and a change in the battery residual capacity are checked.

In step S1803, the minimum bandwidth information required in each of the piconets A and B is obtained. This information may be included in the application, or set by the camera itself. After that, it is determined whether the minimum bandwidths for the piconets A and B can be ensured even when the mode (normal or power-saving mode) is changed. As a result of determination, the flow advances to the mode switching step if the minimum bandwidths can be ensured, and the flow returns to the state monitoring step if the minimum bandwidths cannot be ensured. For example, it is determined whether the traffic of one or both of the piconets A and B decreases in the normal mode. It is determined whether the minimum bandwidths of the piconets A and B can be ensured even when switching from the normal mode to the power-saving mode. Alternatively, it is determined whether the traffic of one or both of the piconets A and B increases in the power-saving mode. It is determined whether the camera needs to be switched to the normal mode since the minimum bandwidth cannot be ensured in the power-saving mode. It is determined whether the error rate decreases in communication in one or both of the piconets A and B in the normal mode. It is determined whether the minimum bandwidths of the piconets A and B can be ensured even when switching from the normal mode to the power-saving mode. Alternatively, in the power-saving mode, it is determined whether the camera needs to be switched to the normal mode since the error rate of one or both of the piconets A and B increases, and the minimum bandwidths of the piconets A and B cannot be ensured. It is determined whether the camera is switched from high-quality image data communication to the low-quality image data communication in the normal mode. It is determined whether the minimum bandwidths of the piconets A and B can be ensured even when switching from the normal mode to the power-saving mode. Alternatively, in the power-saving mode, it is determined whether the camera must be switched to the normal mode since the camera is switched from the low-quality image data communication to the high-quality image data communication, and the minimum bandwidths of the piconets A and B cannot be ensured. In the normal mode, it is determined whether the camera must be switched to the power-saving mode since the power supply method is switched from AC power supply to the battery, or the battery residual capacity becomes equal to or smaller than a predetermined value. In the power-saving mode, it is determined whether the camera is to be switched to the normal mode since the power supply method is switched from the battery to the AC power supply, or the battery residual capacity becomes equal to or larger than a predetermined value.

In step S1804, the current mode is switched from the normal mode to the power-saving mode or vice versa. The CPU 1304 reads out the parameter set 1 from the parameter area 1306 if the current mode shifts to the normal mode, or the parameter set 2 if the current mode shifts to the power-saving mode. The readout parameter set is transmitted to the BT communication unit 1301.

In step S1805, in accordance with the parameter set transmitted from the CPU 1304 in step S1804, the BT communication unit 1301 notifies the AP 1201 in the piconet A of the communication deterrence information A, and notifies the cellular node 1202 in the piconet B of the communication deterrence information B. Upon reception of the communication deterrence information, the AP 1201 and the cellular node 1202 control the communication timing in accordance with the contents.

Figure 18:
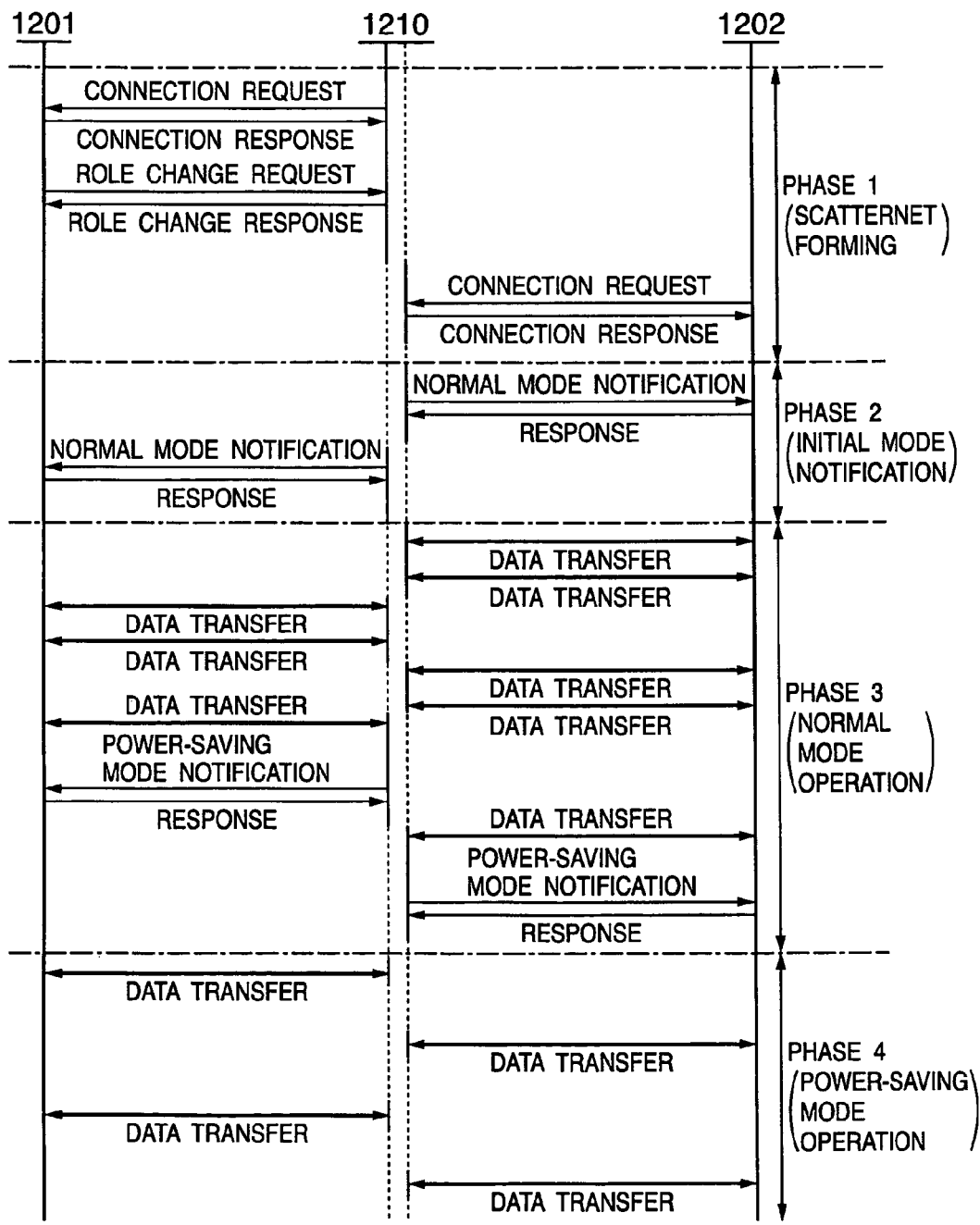
FIG. 18 shows an example of a communication sequence when the node is connected to a new piconet.

FIG. 18 shows an example of a communication sequence when the node is connected to a new piconet.

First, the camera 1210 transmits the connection request to the AP 1201. The AP 1201 sends back a connection response, and the connection process ends. The AP 1201 is controlled to operate as a master node, and immediately transmits a master/slave node role change request to the camera 1210. The camera sends back a role change response, and the role change process ends. Upon completion of the connection between the AP 1201 and camera 1210, the connection request from another node is monitored and controlled to accept the connection request. The cellular node 1202 transmits the connection request to the camera 1210. The camera 1210 sends back the connection response, and the connection process is completed. As described above, in addition to the piconet A including the AP and camera and the piconet B including the camera and cellular node, a scatternet is formed (phase 1).

Upon completion of formation of the scatternet, the camera 1210 notifies the cellular node 1202 and AP 1201 of the normal mode communication deterrence information (communication deterrence information B to the cellular node 1202, and communication deterrence information A to the AP 1201). As described above, shift designation to an initial mode (in this case, the normal mode is the initial mode) has been performed (phase 2).

After shifting to the initial mode, the data can be transferred when the piconet is communicable (phase 3).

When a predetermined state change occurs, the camera 1210 notifies the AP 1201 and cellular node 1202 of the communication deterrence information (communication deterrence information B to the cellular node 1202, and communication deterrence information A to AP 1201) corresponding to the power-saving mode parameter set 2, to designate the shift to the power-saving mode. After shifting to the power-saving mode, the data can be transferred when the piconet is communicable (phase 4).

As described above, in the communication node according to the third embodiment, the limited communication bandwidth can be shared with the plurality of devices, so that the communication bandwidth of the plurality of networks can be effectively used. Additionally, the normal mode in which the communication bandwidth can be maximally used, and the power-saving mode in which the communication bandwidth is limited to suppress power consumption of the communication unit are used. These modes are switched in accordance with the communication state, application state, or device state, thereby performing the proper power-saving control.

Fourth Embodiment

<Outline>

In the fourth embodiment, a node type in a system arrangement and a state change monitoring item in the communication node operation are different from those in the third embodiment.

<System Arrangement>

Figure 19:
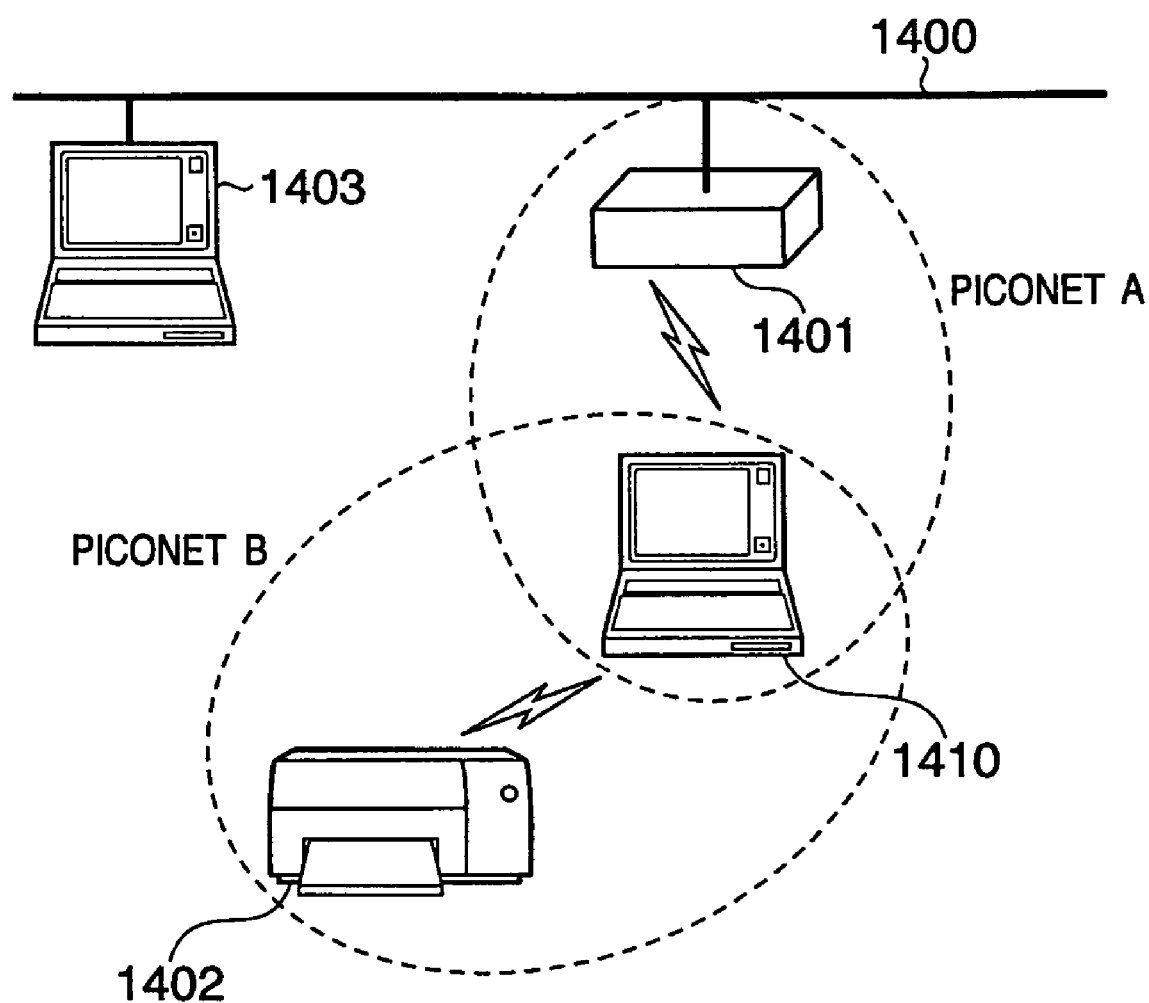
FIG. 19 is a view showing a communication system including a communication equipment according to the fourth embodiment of the present invention.

FIG. 19 is a view showing a communication system including a communication equipment according to the fourth embodiment of the present invention.

This system includes a BT access point (to be abbreviated as an AP hereinafter) 1401 connected to a LAN 1400, a notebook PC 1410 (to be abbreviated as a PC hereinafter) having a BT communication function, a printer 1402 (to be abbreviated as a printer hereinafter) having the BT communication function, and a Web server 1403 (to be abbreviated as a server hereinafter) connected to the LAN 1400. The AP 1401 and PC 1410 construct a piconet A by BT communication. In the piconet A, the AP 1401 serves as a master node, and the PC 1410 serves as a slave node. The PC 1410 and printer 1402 construct a piconet B by BT communication. In the piconet B, the PC 1410 serves as the master node, and the printer 1402 serves as the slave node.

In the above-described arrangement, assume as an application mode that the PC 1410 browses a Web content on the server 1403 via the AP 1401, and simultaneously prints the desired Web content by the printer 1402.

When communicating with the AP 1401 in the piconet A, the PC 1410 notifies the printer 1402 in the piconet B of the communication deterrence information. Alternatively, when communicating with the printer 1402 in the piconet B, the PC 1410 notifies the AP 1401 in the piconet A of the communication deterrence information. Hence, the PC 1410 can timedivisionally join both the piconets. Note that unlike the third embodiment, the PC 1410 serving as the communication node serves as the master node in the piconet B in the fourth embodiment. Hence, the PC 1410 need not especially notify the printer 1402 of the communication deterrence information. However, power consumption can be reduced in the printer 1402 by intentionally notifying of the communication deterrence information. Hence, in the fourth embodiment, the printer 1402 in the piconet is also notified of the communication deterrence information.

<Internal Arrangement of Communication Equipment>

Figure 20:
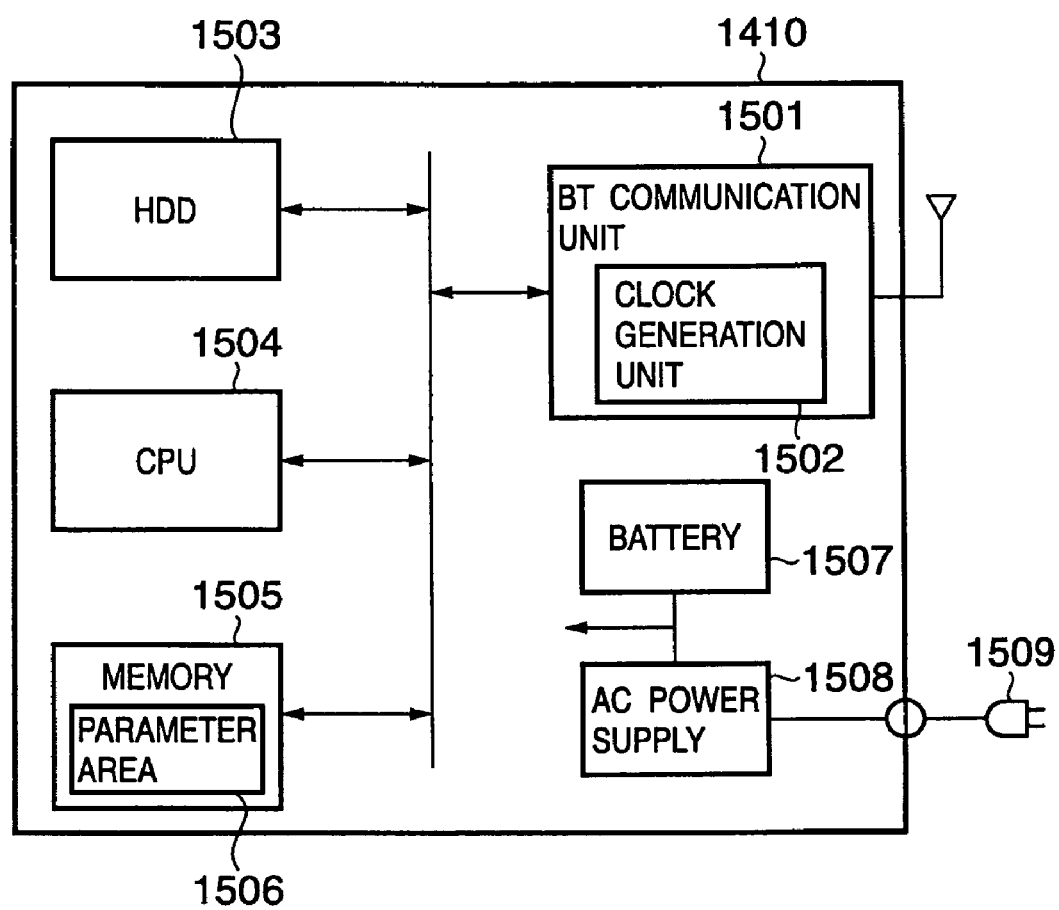
FIG. 20 is a block diagram showing the internal arrangement of a PC serving as the communication equipment according to the fourth embodiment.

FIG. 20 is a block diagram showing the internal arrangement of the PC serving as the communication equipment according to the fourth embodiment.

Reference numeral 1501 denotes a BT communication unit which supplies the BT communication function; 1502, a clock generation unit which generates a BT clock serving as the reference of the communication timing of the BT communication unit 1501; 1503, an HDD which stores an OS (Operating System) and an application (Web browsing and printing) program; 1504, a CPU which controls the overall operation of the camera 1410; 1505, a memory; 1506, a parameter area which stores the communication parameter in the memory 1505; 1507, a battery; 1508, an AC power supply; and 1509, an AC input unit.

The PC 1410 operates by the AC power supply 1508 when the AC input unit 1509 is connected to a commercial power supply, and operates by the battery 1507 when the AC input unit 1509 is not connected to the commercial power supply. The memory 1505 has a work memory area required for the program operation, and a parameter area 1506 in which the communication timing parameter is stored. The PC 1410 is activated by loading the OS stored from the HDD 1503 to wirelessly transmit/receive the data generated by executing the application (Web browsing and printing) program to/from a communication partner via the BT communication unit 1501.

The CPU 1504 can obtain at least a parameter set 1 (for normal mode) and parameter set 2 (for power-saving mode) from the parameter area 1506, and determines which of the parameter sets 1 and 2 is used under the predetermined switching condition. After that, using the BT communication unit 1501, the pieces of communication deterrence information for the piconets A and B are notified in accordance with the determined parameter set.

The PC 1410 prepares the parameter set 1 (for normal mode) and the parameter set 2 (for power-saving mode) in the parameter area 1506. However, these parameter sets may be generated upon activation of the PC 1410 or application, and then stored in the parameter area 1306. Alternatively, the parameter sets may be prepared in advance and used.

<Communication Node Operation>

As described in the third embodiment, an operation procedure in the PC 1410 serving as the communication node will be described with reference to FIG. 17. In the fourth embodiment, the parameter sets 1 and 2 are stored in the parameter area 1506 in advance.

Upon activation of the printing program or Web browsing program of the PC 1410, the flow advances to step S1801 to obtain composite state information indicating, e.g., the traffic value and error rate value between the AP 1401 and the PC 1410, the traffic value and error rate value between the printer 1402 and the PC 1410, whether the Web browsing program is in a idling state, download state, or upload state, whether the printing program manages spooling, transmits the print data, prints the data, receives a paper jam warning, receives an ink shortage warning, or receives another warning, whether the power supply method of the PC 1410 is the AC consent or battery, and the battery remaining value. However, this state information may be partly obtained.

In step S1802, it is determined whether the state information obtained in step S1801 changes to a predetermined condition. More specifically, an increase/decrease in the traffic amount and error rate, a change in the Web browsing program state (idling, download, or upload), a change in the printing program state (spooling, transmission, printing, or presence/absence of paper jam warning, ink shortage warning, and another warning), a change in the power supply method (AC or battery), and a change in the battery residual capacity are checked.

In step S1803, the minimum bandwidth information required in each of the piconets A and B is obtained. This information may be included in the application, or set by the PC 1410 itself. After that, it is determined whether the minimum bandwidths for the piconets A and B can be ensured even when the mode (normal or power-saving mode) is changed. As a result of determination, the flow advances to the mode switching step if the minimum bandwidths can be ensured, and the flow returns to the state monitoring step if the minimum bandwidths cannot be ensured.

In step S1804, the current mode is switched from the normal mode to the power-saving mode or vice versa. The CPU 1504 reads out the parameter set 1 from the parameter area 1506 if the current mode shifts to the normal mode, or the parameter set 2 if the current mode shifts to the power-saving mode. The readout parameter set is transmitted to the BT communication unit 1501.

In step S1805, in accordance with the parameter set transmitted from the CPU 1504 in step S1804, the BT communication unit 1501 notifies the AP 1401 in the piconet A of the communication deterrence information A, and notifies the printer 1402 in the piconet B of the communication deterrence information B. Upon reception of the communication deterrence information, the AP 1401 and the printer 1402 control the communication timing in accordance with the contents.

As described above, as in the third embodiment, the limited communication bandwidth can be shared with the plurality of devices, so that the communication bandwidth of the plurality of networks can be effectively used. Additionally, the normal mode in which the communication bandwidth can be maximally used, and the power-saving mode in which the communication bandwidth is limited to suppress power consumption of the communication unit are used. These modes are switched in accordance with the communication state, application state, or device state, thereby performing the proper power-saving control.

Other Embodiment

The embodiments of the present invention have been described above. The present invention can be applied to an arbitrary time division communication type wireless communication scheme. For example, the present invention can also be applied to a wireless LAN (IEEE802.11) node group. The present invention can also be applied to a communication system using a UWB (Ultra Wide Band).

The present invention is also achieved by supplying a program which implements the function of the above-described embodiments to the system or equipment directly or from a remote site, and causing the system or equipment to read out and execute the supplied program code. Hence, to implement the functional processing of the present invention by a computer, the program code itself, which is installed in the computer, is also incorporated in the technical range of the present invention.

In this case, the program can take any form such as an object code, a program to be executed by an interpreter, or script data to be supplied to the OS as long as the functions of the program can be obtained.

As a recording medium for supplying the program, for example, a Floppy® disk, hard disk, optical disk, magnetooptical disk, MO, CD-ROM, CD-R, CD-RW, magnetic tape, nonvolatile memory card, ROM, or DVD (DVD-ROM or DVD-R) can be used.

As another program supply method, a client computer may be connected to a homepage on the Internet using a browser in the computer, and the computer program itself of the present invention or a compressed file containing an automatic install function may be downloaded from the homepage to a recording medium such as a hard disk. A program code that constitutes the program of the present invention may be divided into a plurality of files, and the files may be downloaded from different homepages. That is, a WWW server which causes a plurality of users to download a program file that causes a computer to implement the functional processing of the present invention is also incorporated in the claim of the present invention.

The program of the present invention may be encrypted, stored in a storage medium such as a CD-ROM and distributed to users. Any user who satisfies predetermined conditions may be allowed to download key information for decryption from a homepage through the Internet, execute the encrypted program using the key information, and install the program in the computer.

The function of the above-described embodiment is implemented not only when the readout program is executed by the computer but also when the OS or the like, which is running on the computer, performs part or all of actual processing on the basis of the instructions of the program.

The function of the above-described embodiment is also implemented when the program read out from the storage medium is written in the memory of a function expansion board inserted into the computer or a function expansion unit connected to the computer, and the CPU of the function expansion board or function expansion unit performs part or all of actual processing on the basis of the instructions of the program.

As many apparently widely different embodiments of the present invention can be made without departing from the spirit and scope thereof, it is to be understood that the invention is not limited to the specific embodiments thereof except as defined in the claims.

CLAIM OF PRIORITY

This application claims priority from Japanese Patent Application Nos. 2004-350210 filed on Dec. 2, 2004 and 2004-347243 filed on Nov. 30, 2004, the entire contents of which are hereby incorporated by reference herein.

What is claimed is:

1. A wireless communication equipment which connects to and communicates with a plurality of networks periodically, comprising:
   a storing unit which stores a first parameter set and a second parameter set, wherein each of the first and the second parameter sets includes information about a first communication deterrence period which inhibits communication between the wireless communication equipment and a first network, and a second communication deterrence period which inhibits communication between the wireless communication equipment and a second network different from the first network; wherein the first communication deterrence period and the second communication deterrence period are not overlapped in the first parameter set, and the first communication deterrence period and the second communication deterrence period are overlapped at least in part in the second parameter set;
   a detection unit which detect a change of state information in each of the first and the second networks during communicating with other devices;
   a notification unit which selects one of the first and the second parameter sets according to the detected change of state information, and notifies other devices in each of the first and the second networks of the selected parameter set; and
   a communication unit which communicates with other devices in each of the first and the second networks in accordance with notified parameter set.

2. The equipment according to claim 1, wherein each of the first and the second parameter sets includes information about deterrence control start timing and communication deterrence period.

3. The equipment according to claim 1, wherein each of the first and the second parameter sets further includes information about communication deterrence interval.

4. The equipment according to claim 1, further comprising:
   an acquiring unit which acquires information about bandwidths required in each of the first and the second networks; and
   a determination unit which determines whether the required bandwidths can be ensured at least by using the second parameter set,
   wherein the notification unit selects one of the first and the second parameter sets according to the determination result by the determination unit, and notifies other devices in each of the first and the second networks of selected parameter set.

5. The equipment according to claim 1, wherein said change of state information includes at least one among an increase and decrease in the traffic amount, an increase and decrease in the error rate, a change in the operation state of the application program, a change in the power supply method and a change in the battery residual capacity.

6. A control method of a wireless communication equipment which connects to and communicates with a plurality of networks periodically, comprising:
   storing a first parameter set and a second parameter set in a storing unit, wherein each of the first and the second parameter sets includes information about a first communication deterrence period which inhibits communication between the wireless communication equipment and a first network, and a second communication deterrence period which inhibits communication between the wireless communication equipment and a second network different from the first network; wherein the first communication deterrence period and the second communication deterrence period are not overlapped in the first parameter set, and the first communication deterrence period and the second communication deterrence period are overlapped at least in part in the second parameter set;
   detecting a change of state information in each of the first and the second networks during communicating with other devices;
   selecting one of the first and the second parameter sets according to the detected change of state information, and notifying other devices in each of the first and the second networks of the selected parameter set; and
   communicating with other devices in each of the first and the second networks in accordance with notified parameter set.

* * * * *